(12) United States Patent  (10) Patent No.: US 8,550,915 B2
Ashida et al.  (45) Date of Patent: *Oct. 8, 2013

(54) GAME CONTROLLER WITH ADAPTER DUPLICATING CONTROL FUNCTIONS

(75) Inventors: Kenichiro Ashida, Kyoto (JP); Junji Takamoto, Kyoto (JP); Masato Ibuki, Kyoto (JP); Shinji Yamamoto, Kyoto (JP); Daisuke Kumazaki, Kyoto (JP); Fumiyoshi Suetake, Kyoto (JP); Akiko Suga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/028,648

(22) Filed: Feb. 16, 2011

(65) Prior Publication Data

US 2011/0195785 A1   Aug. 11, 2011

Related U.S. Application Data

(63) Continuation of application No. 11/790,780, filed on Apr. 27, 2007.

(30) Foreign Application Priority Data

May 9, 2006  (JP) ................................. 2006-129732

(51) Int. Cl.
*A63F 13/02* (2006.01)
*A63F 13/06* (2006.01)

(52) U.S. Cl.
USPC ................... 463/37; 463/36; 463/38; 463/46; 463/47; 345/156; 345/161

(58) Field of Classification Search
USPC ............. 345/156, 161; 463/37, 38, 36, 46, 47
See application file for complete search history.

(56) References Cited

U.S. PATENT DOCUMENTS

| D220,268 S | 3/1971 | Kliewer |
| 4,739,128 A | 4/1988 | Grisham |
| 4,969,647 A | 11/1990 | Mical et al. |

(Continued)

FOREIGN PATENT DOCUMENTS

| GB | 2 244 546 | 5/1990 |
| JP | 3-74434 | 7/1991 |

(Continued)

OTHER PUBLICATIONS

"Controllers-Atari Space Age Joystick," AtariAge: Have You Played Atari Today? www.atariage.com/controller_page.html?SystemID=2600&ControllerID=12.

(Continued)

*Primary Examiner* — Lawrence Galka
(74) *Attorney, Agent, or Firm* — Nixon & Vanderhye, P.C.

(57) ABSTRACT

A video game controller for a video game and a receptor assembly may include a controller core unit including a housing formed with a top, bottom and opposite sides, at least the top having a plurality of control buttons thereon; and a base portion provided with a first connector; a receptor having a shape substantially similar to a component appearing in the video game. The receptor may be a gun-shaped sub-unit with a barrel portion and a gripper portion with an open slot adapted to receive the core unit.

22 Claims, 26 Drawing Sheets

(56) References Cited

U.S. PATENT DOCUMENTS

| | | | |
|---|---|---|---|
| 4,994,795 A | 2/1991 | MacKenzie | |
| D320,624 S | 10/1991 | Taylor | |
| D322,242 S | 12/1991 | Cordell | |
| D325,225 S | 4/1992 | Ashida | |
| D328,463 S | 8/1992 | King et al. | |
| D331,058 S | 11/1992 | Morales | |
| 5,178,477 A | 1/1993 | Gambaro | |
| 5,192,082 A | 3/1993 | Inoue et al. | |
| 5,207,426 A | 5/1993 | Inoue et al. | |
| D338,242 S | 8/1993 | Cordell | |
| 5,259,626 A | 11/1993 | Ho | |
| D345,164 S | 3/1994 | Grae | |
| 5,296,871 A | 3/1994 | Paley | |
| 5,332,322 A | 7/1994 | Gambaro | |
| D350,782 S | 9/1994 | Barr | |
| D351,430 S | 10/1994 | Barr | |
| D360,903 S | 8/1995 | Barr et al. | |
| D362,870 S | 10/1995 | Oikawa | |
| 5,459,489 A | 10/1995 | Redford | |
| 5,506,605 A | 4/1996 | Paley | |
| 5,512,892 A | 4/1996 | Corballis et al. | |
| 5,523,800 A | 6/1996 | Dudek | |
| 5,528,265 A | 6/1996 | Harrison | |
| 5,561,543 A | 10/1996 | Ogawa | |
| 5,563,628 A | 10/1996 | Stroop | |
| D375,326 S | 11/1996 | Yokoi et al. | |
| D376,826 S | 12/1996 | Ashida | |
| D379,832 S | 6/1997 | Ashida | |
| 5,643,087 A | 7/1997 | Marcus et al. | |
| 5,670,988 A | 9/1997 | Tickle | |
| 5,724,106 A | 3/1998 | Autry et al. | |
| D393,884 S | 4/1998 | Hayami | |
| D395,464 S | 6/1998 | Shiibashi et al. | |
| 5,769,719 A | 6/1998 | Hsu | |
| 5,785,317 A | 7/1998 | Sasaki | |
| D397,162 S | 8/1998 | Yokoi et al. | |
| D402,328 S | 12/1998 | Ashida | |
| D405,071 S | 2/1999 | Gambaro | |
| D407,761 S | 4/1999 | Barr | |
| 5,900,867 A | 5/1999 | Schindler et al. | |
| D412,940 S | 8/1999 | Kato et al. | |
| 5,967,898 A | 10/1999 | Takasaka et al. | |
| D419,199 S | 1/2000 | Cordell et al. | |
| D419,200 S | 1/2000 | Ashida | |
| D433,381 S | 11/2000 | Talesfore | |
| D442,998 S | 5/2001 | Ashida | |
| 6,238,291 B1 | 5/2001 | Fujimoto et al. | |
| 6,296,570 B1 | 10/2001 | Miyamoto et al. | |
| D456,410 S | 4/2002 | Ashida | |
| D456,854 S | 5/2002 | Ashida | |
| 6,383,079 B1 | 5/2002 | Takeda et al. | |
| 6,392,613 B1* | 5/2002 | Goto | 345/30 |
| D458,972 S | 6/2002 | Ashida | |
| D459,727 S | 7/2002 | Ashida | |
| D460,787 S | 7/2002 | Nishikawa | |
| D462,683 S | 9/2002 | Ashida | |
| 6,518,952 B1 | 2/2003 | Leiper | |
| D473,942 S | 4/2003 | Motoki et al. | |
| 6,540,611 B1 | 4/2003 | Nagata | |
| 6,544,124 B2 | 4/2003 | Ireland et al. | |
| 6,565,444 B2 | 5/2003 | Nagata et al. | |
| 6,597,342 B1* | 7/2003 | Haruta | 345/157 |
| 6,672,962 B1* | 1/2004 | Ozaki et al. | 463/37 |
| 6,743,104 B1 | 6/2004 | Ota et al. | |
| 6,752,719 B2 | 6/2004 | Himoto et al. | |
| D495,336 S | 8/2004 | Andre et al. | |
| 6,811,491 B1* | 11/2004 | Levenberg et al. | 463/47 |
| 6,816,151 B2 | 11/2004 | Dellinger | |
| 6,821,204 B2 | 11/2004 | Aonuma et al. | |
| 6,850,221 B1 | 2/2005 | Tickle | |
| D502,468 S | 3/2005 | Knight et al. | |
| D503,750 S | 4/2005 | Kit et al. | |
| D505,424 S | 5/2005 | Ashida et al. | |
| 6,933,861 B2 | 8/2005 | Wang | |
| 7,081,051 B2 | 7/2006 | Himoto et al. | |
| D531,228 S | 10/2006 | Ashida et al. | |
| D531,585 S | 11/2006 | Weitgasser et al. | |
| 7,136,674 B2* | 11/2006 | Yoshie et al. | 455/557 |
| D543,246 S | 5/2007 | Ashida et al. | |
| 7,400,496 B2* | 7/2008 | Sauer et al. | 361/679.09 |
| 7,653,771 B2* | 1/2010 | Liberty | 710/303 |
| 7,774,155 B2 | 8/2010 | Sato et al. | |
| 8,057,309 B1* | 11/2011 | Mead et al. | 463/48 |
| 8,469,815 B2* | 6/2013 | Hovseth | 463/38 |
| 2001/0031662 A1 | 10/2001 | Larian | |
| 2002/0098887 A1* | 7/2002 | Himoto et al. | 463/37 |
| 2002/0107069 A1 | 8/2002 | Ishino | |
| 2004/0254020 A1* | 12/2004 | Dragusin | 463/46 |
| 2005/0017454 A1 | 1/2005 | Endo et al. | |
| 2005/0176485 A1* | 8/2005 | Ueshima | 463/4 |
| 2005/0215322 A1 | 9/2005 | Himoto et al. | |
| 2005/0233808 A1 | 10/2005 | Himoto et al. | |
| 2005/0239548 A1* | 10/2005 | Ueshima et al. | 463/36 |
| 2006/0258452 A1* | 11/2006 | Hsu | 463/36 |
| 2007/0021208 A1 | 1/2007 | Mao et al. | |
| 2007/0049374 A1 | 3/2007 | Ikeda et al. | |
| 2007/0050597 A1 | 3/2007 | Ikeda | |
| 2007/0052177 A1 | 3/2007 | Ikeda et al. | |
| 2007/0060391 A1 | 3/2007 | Ikeda et al. | |
| 2007/0066394 A1 | 3/2007 | Ikeda et al. | |
| 2007/0072680 A1 | 3/2007 | Ikeda | |
| 2007/0091084 A1* | 4/2007 | Ueshima et al. | 345/419 |
| 2007/0265075 A1* | 11/2007 | Zalewski | 463/36 |
| 2008/0015017 A1 | 1/2008 | Ashida et al. | |
| 2008/0039202 A1 | 2/2008 | Sawano et al. | |
| 2009/0005166 A1 | 1/2009 | Sato | |

FOREIGN PATENT DOCUMENTS

| | | |
|---|---|---|
| JP | 6-50758 | 2/1994 |
| JP | 6-154422 | 6/1994 |
| JP | 06-308879 | 11/1994 |
| JP | 07-107573 | 4/1995 |
| JP | 07-115690 | 5/1995 |
| JP | 10-99542 | 4/1998 |
| JP | 10-295935 | 10/1998 |
| JP | 11-506857 | 6/1999 |
| JP | 2001-128838 | 5/2001 |
| JP | 2002-233665 | 8/2002 |
| JP | 2004-313492 | 11/2004 |
| JP | 2005-040493 | 2/2005 |
| JP | 2005-063230 | 3/2005 |
| WO | 02/17054 | 2/2002 |
| WO | WO03056505 | 7/2003 |

OTHER PUBLICATIONS

"Controllers-Booster Grip," AtariAge: Have You Played Atari Today? www.atariage.com/controller_page.html?SystemID=2600&ControllerID=18.

"Coleco Vision: Super Action™ Controller Set," www.vintagecomputing.com/wp-content/images/retroscan/coleco_sac_1_large.jpg.

Electro-Plankton Weblog, http://www.tranism.com/weblog/2005/09/, This is the Revelotion Nintendo Style, Sep. 15, 2005, 2 pgs.

CNET News.com, http://news.com.com/2300-1043_3-6070295-2.html?tag=ne.gall.pg, "Nintendo Wii Swings Into Action," May 25 2006, 1pg.

Gyration Ultra Cordless Optical Mouse, User Manual, 1-15, Gyration, Inc., Saratoga, CA (2003).

Hinckley, Ken et al., The VideoMouse: A Camera_based Multi-Degree_f_freedom input Device, CHI Letters vol. 1, 1, UIST "99, Ashville, NC pp. 103-112 (1999).

European Search Report for Application No. EP 07 11 2880 on Oct. 18, 2007, in Munich.

Ikeda et al., entitled, "Video Game System With Wireless Modular Handheld Controller," U.S. Appl. No. 11/532,328, filed Sep. 15, 2006, pending.

Ikeda et al., entitled, "Game Operating Device," U.S. Appl. No. 11/446,187, filed Jun. 5, 2006, pending.

Ikeda et al., entitled, "Game Operating Device," U.S. Appl. No. 11/446,188, filed Jun. 5, 2006, pending.

(56) References Cited

OTHER PUBLICATIONS

English Abstract for Japanese Patent No. JP10021000, published Jan. 23, 1998.
English Abstract for Japanese Patent No. JP11053994, published Feb. 26, 1999.
English Abstract for Japanese Patent No. JP11099284, published Apr. 13, 1999.
English Abstract for Japanese Patent No. JP2006136694, published Jun. 1, 2006.
English Abstract for Japanese Patent No. JP2001038052, published Feb. 13, 2001.
English Abstract for Japanese Patent No. JP2002224444, published Aug. 13, 2002.
English Abstract for Japanese Patent No. WO9732641, published Sep. 12, 1997.
Kennedy, P.J., "Hand-Held Data Input Device," *IBM Technical Disclosure Bulletin*, vol. 26, No, 11, Apr. 1984, pp. 5826-5827.
"Controllers-Booster Grip," *AtariAge: Have You Played Atari Today! www.atariage.com/controller_page.html?SystemID=2600 &ControllerID=18*.
CNET News.com, http://news.com.com/2300-1043_3-6070295-2.html?tag=ne.gall.pg, "Nintendo Wii Swings Into Action," May 25, 2006, 1pg.
U.S. Appl. No. 11/542,842, May 2007, Ashida et al.
WO 99/58214 (corresponds to U.S. 6,672,962 of record in parent application).
Note: U.S. Patent No. 6,296,570 is a corresponding English publication to JP10-295935.

\* cited by examiner

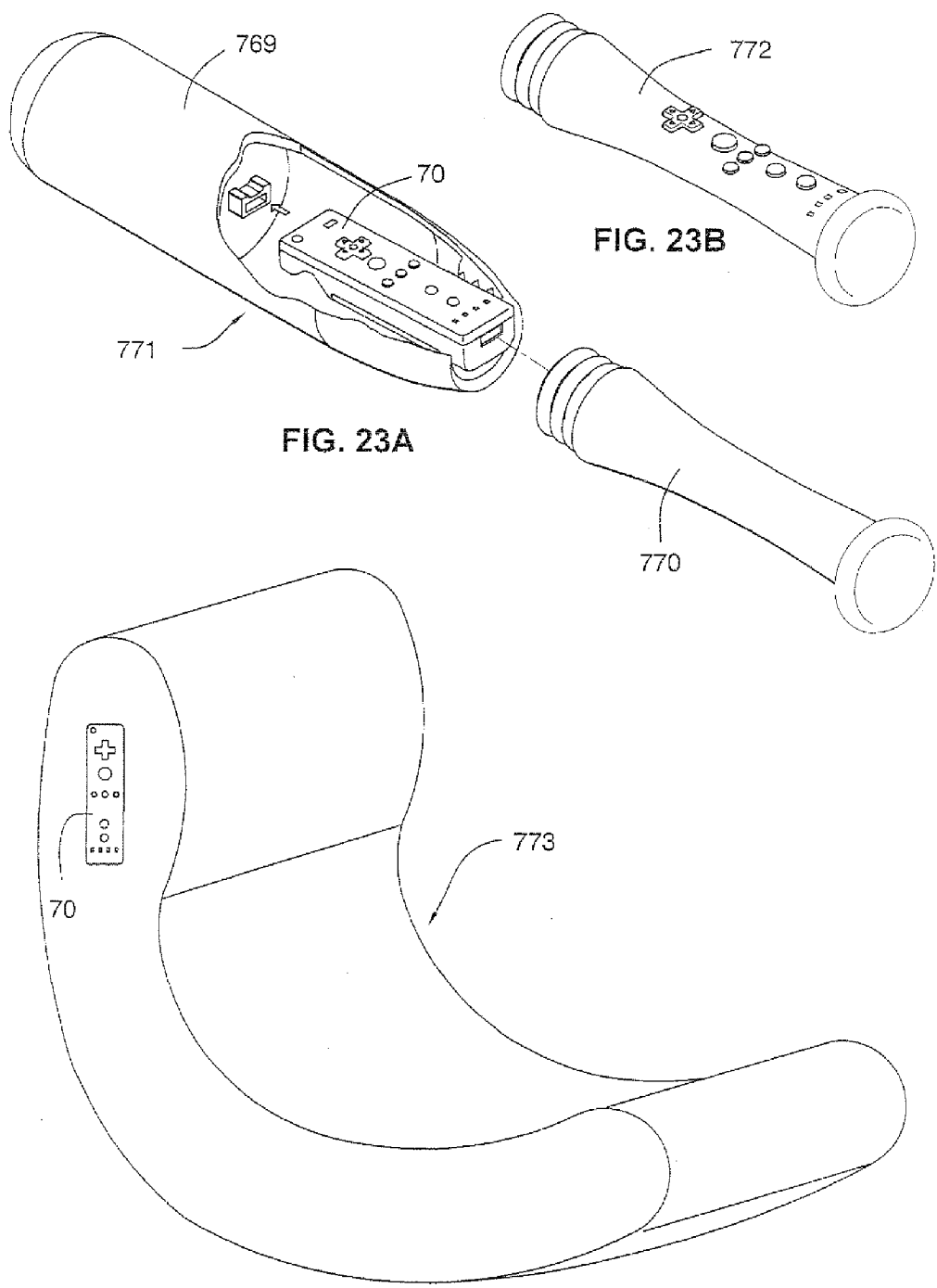

GAME CONTROLLER WITH ADAPTER DUPLICATING CONTROL FUNCTIONS

CROSS-REFERENCE TO RELATED APPLICATIONS

The application is a continuation of U.S. patent application Ser. No. 11/790,780 filed Apr. 27, 2007, which claims priority from Japanese Application No. 2006/129732 filed May 9, 2006. The entire subject matter of all of the above is incorporated by reference.

BACKGROUND AND SUMMARY

An example of a prior gun-shaped game controller is disclosed in U.S. Pat. No. 6,672,962. The controller is thus formed to include a barrel, a trigger unit, and a grip unit. Installed on the tip of the barrel is an artificial retina unit which takes in game images from a monitor screen. Attached to the trigger unit is a trigger lever that can be operated with a player's finger. A start switch, a cross-direction key, and a reload switch are installed in a position on the top of the grip unit of the controller main body, and corresponds to the hammer section of an actual gun. In the operation of a shooting game, and when the trigger lever is pulled, the screen of a monitor is brightened for a moment. The light is detected with a light detection means in the gun-type controller, and the point of impact is determined based on the light detection signal.

In the gun-type controller as described in the '962 patent, the trigger unit is located below the barrel. However, if the trigger level is operated with an index finger, and the cross-direction key operated with a thumb, the controller is difficult to operate while maintaining a stable holding state because the controller itself needs to be supported by holding the grip unit with only the remaining three fingers.

Furthermore, in the gun-type controller according to the '962 patent, because the cross-direction key is installed in a position corresponding to the hammer section, there is a distance between the section operated with the index finger and the section operated with the thumb, requiring extension of the fingers for holding it, which in turn limits the movable range of the fingers, making it difficult to move them simultaneously.

BRIEF DESCRIPTION OF EXEMPLARY EMBODIMENTS

In one exemplary and non-limiting embodiment disclosed herein, a gun-type game controller is provided which can be held stably during operation and which is easy to operate. Various other exemplary embodiments incorporate a core controller unit in other simulated or real articles that may or may not have some relationship to the subject matter of the game itself.

In the example where the controller imitates a gun, the controller is equipped with a housing having a barrel portion and a gripper portion formed on one side of the barrel, a penetrating hole or aperture which penetrates a side of the barrel portion in a position toward the gripper portion, such that an index finger can be inserted into the hole when the gripper is held with the user's palm, middle finger, third finger, and little finger. A first control switch member installed inside the penetrating hole can be pushed inward, in a direction toward the gripper portion.

Because it becomes possible to operate the first control switch member with an index finger, and support the barrel portion with a middle finger while holding the gripper portion, the controller can be held stably even while playing the game.

A second embodiment relates to a game controller similar to the first embodiment, but wherein a second control switch member is installed in a position on the top of the housing where it can be operated with a thumb when the gripper portion is held by the player.

A third embodiment relates to a game controller similar to the second embodiment, but wherein the second control switch member is a universal stick which can be inclined 360-degrees. While holding the controller stably, in accordance with the second and third embodiments, operation/input with a thumb can be performed in addition to operation/input with an index finger.

A fourth embodiment relates to a game controller similar to the first embodiment, but equipped with an imaging device in the tip of the barrel portion of the housing for imaging a marker placed in a display side in order to compute the pointed position on the display.

Even when the center of gravity of the gun shifts forward by installing an imaging device in the tip of the barrel portion, the controller can be stably held.

A fifth embodiment relates to a game controller similar to the first embodiment, but wherein a mounting mechanism is installed on the tip of the barrel portion of the housing for mounting another game controller unit in a detachable manner.

A sixth embodiment relates to a game controller comprising a first control unit and a second control unit to which said first control unit can be mounted in a freely detachable manner. The game controller first control unit is equipped with an elongated first housing and comprises an imaging device on one end of the first housing for imaging a marker placed in a display side in order to compute the pointed position on the display. The game controller second control unit (or sub-unit) is equipped with a second housing imitating a gun having an elongated barrel portion and a gripper portion formed rearwardly of the barrel portion, wherein a mounting mechanism is installed on the tip of said barrel portion for mounting the first control unit in a freely detachable manner. A penetrating hole penetrates a side of said barrel portion and is formed toward the gripper portion of the barrel, and a first control switch which can be pushed inwardly toward the gripper portion is installed inside the penetrating hole.

A seventh embodiment relates to a game controller similar to the sixth embodiment, wherein the mounting mechanism comprises a storage unit for storing at least a part of the first control unit and a connector installed inside the storage unit for electrically connecting the first control unit and the second control unit.

By combining or separating two control units, the controllers can be selectively used according to the game requirements, enabling a wide range of operations.

Various additional embodiments are disclosed herein, wherein the control units are detachably secured to other simulated or real objects or articles that may or may not be related to the subject matter of the game being controlled.

Accordingly, in one exemplary but nonlimiting embodiment, there is provided a video game controller and receptor assembly comprising an elongated, substantially rectangular electronic video game controller core unit for operating an electronic game comprising a housing having a top, bottom, opposite sides, a forward end and a rearward end, the top having a plurality of control buttons including a crosskey thereon and the bottom having a trigger switch supported therein; and a receptor unit shaped to simulate a device held or worn by a character in the electronic game, the receptor formed with an open-topped recess with sides and a bottom defining a shape substantially similar to at least a portion of the bottom and opposite sides of the video game controller core unit received in the recess.

In another exemplary but nonlimiting embodiment, there is provided a receptor for an electronic video game controller comprising: a receptor housing including an elongated portion and a gripper portion; a trigger switch located in the elongated portion adjacent the gripper portion, the elongated portion formed with a substantially U-shaped slot open at a forward end of the receptor housing and adapted to receive an electronic video game controller; the substantially U-shaped slot having a length sufficient to support a portion of the electronic video game controller substantially co-axially with the elongated portion of the receptor; and wherein a rearward end of the substantially U-shaped slot is provided with a first connector adapted to align with and engage a mating second connector on the rearward end of the electronic video game controller to thereby enable electrical connection between the receptor and the electronic video game controller.

BRIEF DESCRIPTION OF THE DRAWINGS

These and other features and advantages of exemplary illustrative non-limiting implementations will be better and more completely understood by referring to the following detailed description in conjunction with the drawings of which:

FIGS. 23a and 23b are examples of core units detachably inserted within or incorporated within simulated bat devices;

FIG. 24 is an example of a core unit detachably received within a rocking seat device;

DETAILED DESCRIPTION OF THE DRAWINGS

Figure 1:
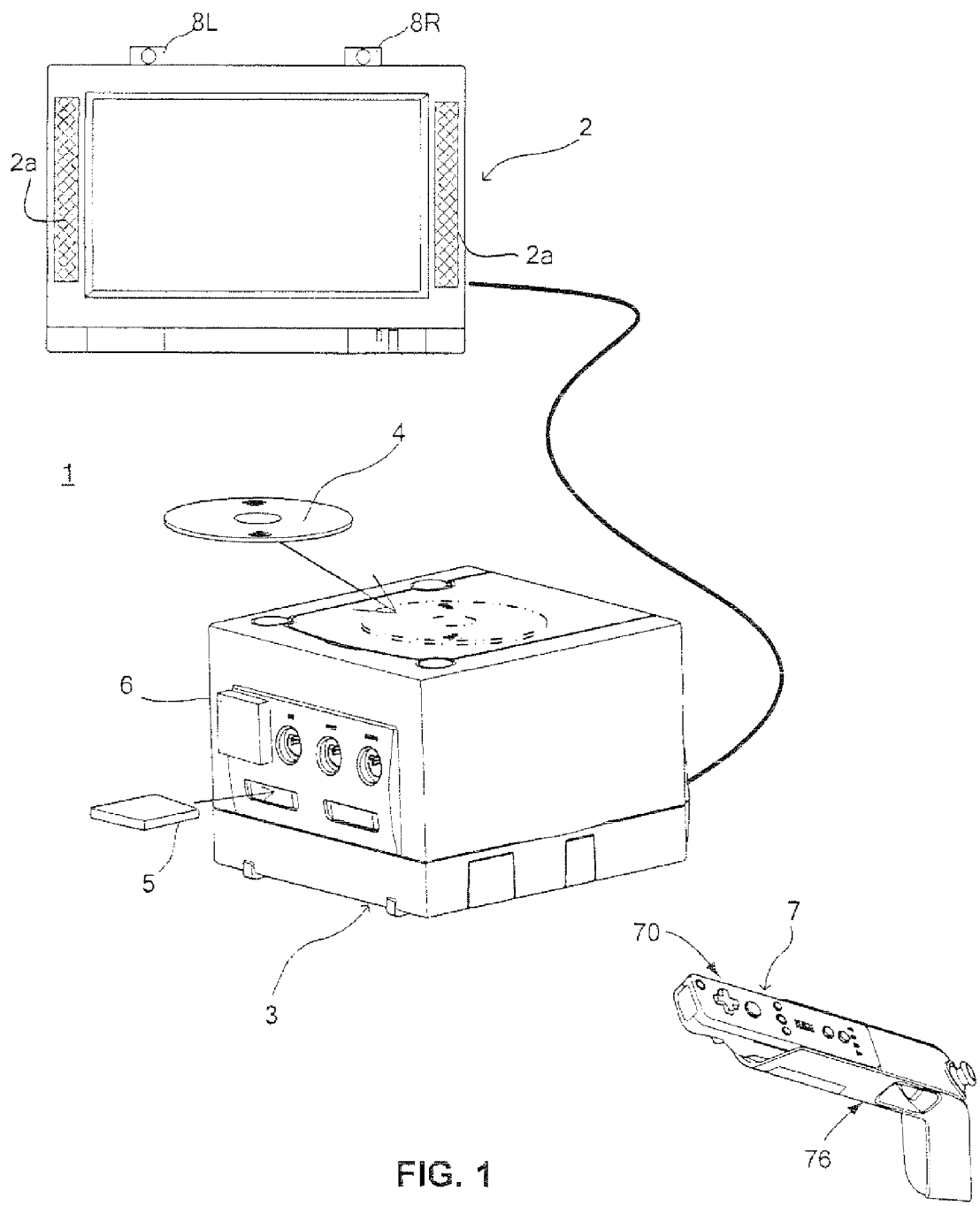
FIG. 1 is an isometric view of a game system in accordance with an exemplary embodiment.

FIG. 1 is an external view of a game system 1 containing a game controller in accordance with a non-limiting exemplary embodiment of the present invention. In FIG. 1, the game system 1 includes a desktop game machine (hereafter described simply as a game machine) 3 connected via a connection cable to a display (hereafter described as a monitor) 2 equipped with speakers 2a (such as found in a home-use television receiver), and a controller 7 which feeds operation data to the game machine 3. Connected to (or built into) the game machine 3 is a reception unit 6 via a connection terminal. The reception unit 6 receives transmission data wirelessly sent from the controller 7, and the controller 7 and the game machine 3 are connected via wireless communication. Removably inserted in the game machine 3 is an optical disk 4 which is an example of information storage medium used exchangeably for the game machine 3. Installed on the top main face of the game machine 3 are a power on/off switch, a reset switch for game processing, and an open switch to open the top cover of the game machine. The top cover opens by a player pressing down the open switch, allowing insertion/removal of the optical disk 4.

Also, removably installed freely in the game machine 3 upon necessity is an external memory card 5 with built-in backup memory etc. which is a fixed storage for saved data etc. The game machine 3 executes a game program etc. stored on the optical disk 4 and displays the results on the monitor 2 as game images. The game machine 3 can also recreate a game state executed in the past using the saved data stored in the external memory card 5 and display the game images on the monitor 2. Then, a player can enjoy the game progress by operating the controller 7 while watching the game images displayed on the monitor 2.

The controller 7 wirelessly transmits data from a built-in communication unit 75 (described hereafter in reference to FIG. 10) to the game machine 3 to which the reception unit 6 is connected, utilizing Bluetooth™ technology. The structure of the controller 7 is explained in detail hereafter, and generally comprises two control units (a core unit 70 (FIG. 3) and a sub-unit 76 described hereafter) mutually connected via a connector. In this exemplary embodiment, the control unit (sub-unit 76 in FIG. 3) has a shape imitating a gun as a whole. Also, installed in each unit is a control mechanism such as multiple control buttons, keys, and sticks. Furthermore, the other control unit (core unit 70) is equipped with an imaging information operating unit for taking images viewed from the core unit 70. As an example of an imaging target of this imaging information operating unit, two LED modules 8L and 8R (FIG. 12) which emit infrared light toward the front of the monitor 2, are installed near the display screen of the monitor 2.

Figure 2:
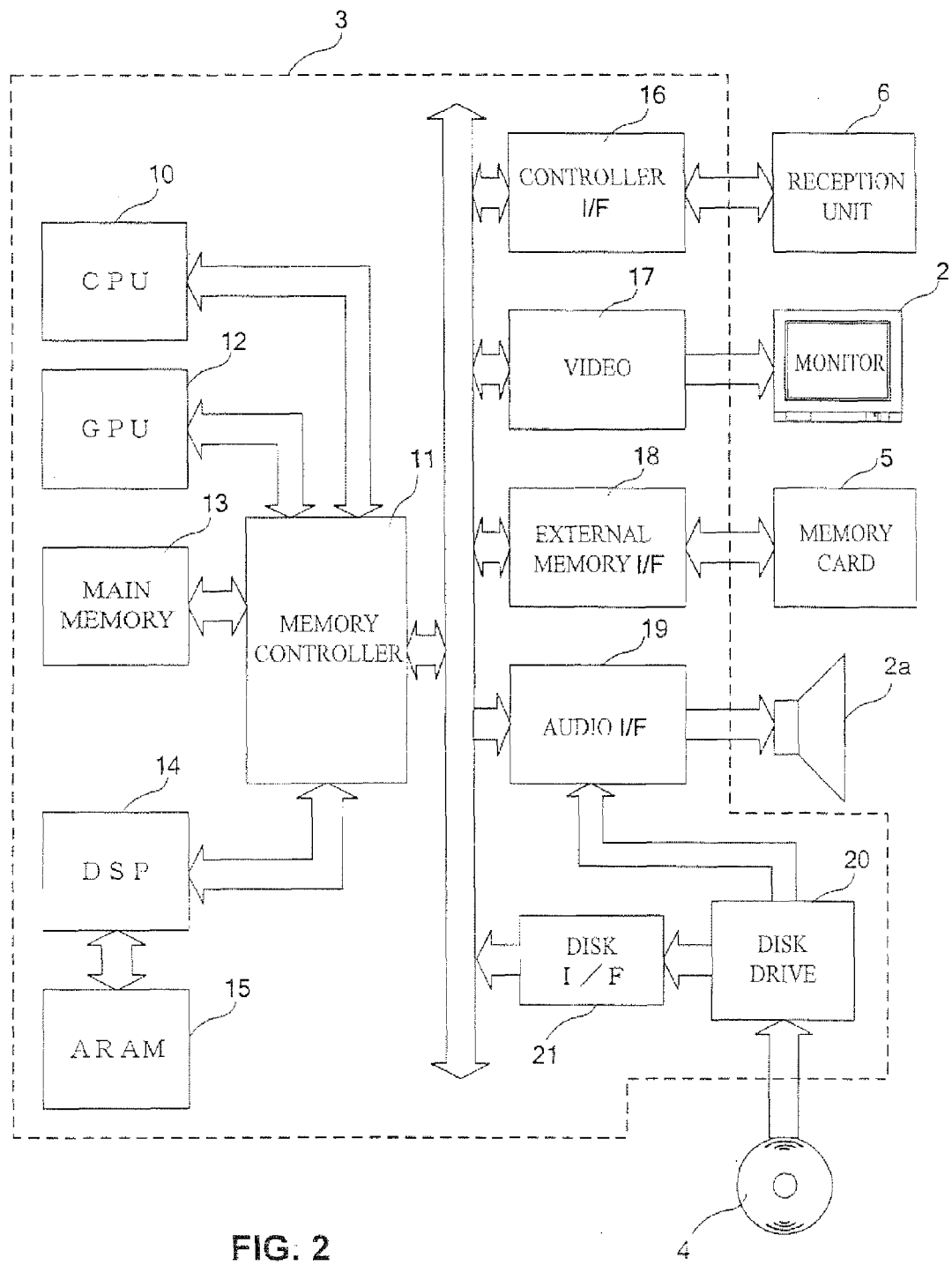
FIG. 2 is a functional block diagram of the game component in FIG. 1.

The structure of the game machine 3 is explained hereafter, with reference to the functional block diagram of FIG. 2.

In FIG. 2, the game machine 3 is equipped with a RISC CPU (Central Processing Unit) 10, for example, which executes various kinds of programs. The CPU 10 executes a startup program stored in a boot ROM (not shown), and after performing initialization of memory such as a main memory 13, executes a game program stored on the optical disk 4, performing game processing etc. according to the game program. Connected to the CPU 10 via a memory controller 11 are a GPU (Graphics Processing Unit) 12, the main memory 13, a DSP (Digital Signal Processor) 14, and an ARAM (Audio RAM) 15. Also, connected to the memory controller 11 via specified buses are a controller I/F (interface) 16, a video I/F 17, an external memory I/F 18, an audio I/F 19, and a disk I/F 21, to which the reception unit 6, the monitor 2, the external memory card 5, the speakers 2a, and a disk drive 20 are connected, respectively.

The CPU 12 performs image processing based on instructions of the CPU 10, and comprises a semiconductor chip which performs necessary computation processes for displaying 3D graphics, for example. The CPU 12 performs image processing utilizing a memory exclusively for image processing (not shown) and a partial storage area of the main memory 13. The GPU 12 uses these to create game image data and movie pictures to be displayed on the monitor 2, and outputs them to the monitor via the memory controller 11 and the video I/F 17 as appropriate.

The main memory 13 is a storage area used by the CPU 10, and stores game programs etc. necessary for processing by the CPU 10. For example, the main memory 13 stores game programs and various kinds of data which are read out from the optical disk 4 by the CPU 10. The game programs and various kinds of data stored by this main memory 13 are executed by the CPU 10.

The DSP 14 processes sound data generated in the CPU 10 when a game program is executed, and connected to it is the ARAM 15 for storing its sound data etc. The ARAM 15 is used when the DSP 14 performs a specified processing step, (for example, storing game programs and sound data which were read ahead). The DSP 14 reads out sound data stored in the ARAM 15 and has them output to the speakers built into the monitor 2 via the memory controller 11 and the audio I/F 19.

The memory controller 11 controls overall data transfer, to which the various kinds of I/Fs are connected. The controller I/F 16 consists of four controller I/Fs 16a-16d for example (not separately shown), and via their connectors it connects external equipment that can fit to the game machine 3 in a communicable manner. For example, the reception unit 6 fits with a connector and is connected with the game machine 3 via the controller I/F 16. As stated above, the reception unit 6 receives transmission data from the controller 7, and outputs said transmission data to the CPU 10 via the controller I/F 16. Connected to the video I/F 17 is the monitor 2. Connected to the external memory I/F 18 is the external memory card 5, allowing access with backup memory etc., installed in the external memory card 5. Connected to the audio I/F 19 are the speakers 2a built into the monitor 2, allowing the sound data read out from the ARAM 15 by the DSP 14 and sound data directly output from the disk drive 20 to be output through the speakers 2a, Connected to the disk I/F 21 is the disk drive 20 which reads out data stored on the optical disk 4 placed in a specified read-out position, and outputs it to a bus of the game machine 3 and the audio I/F 19.

Figure 3:
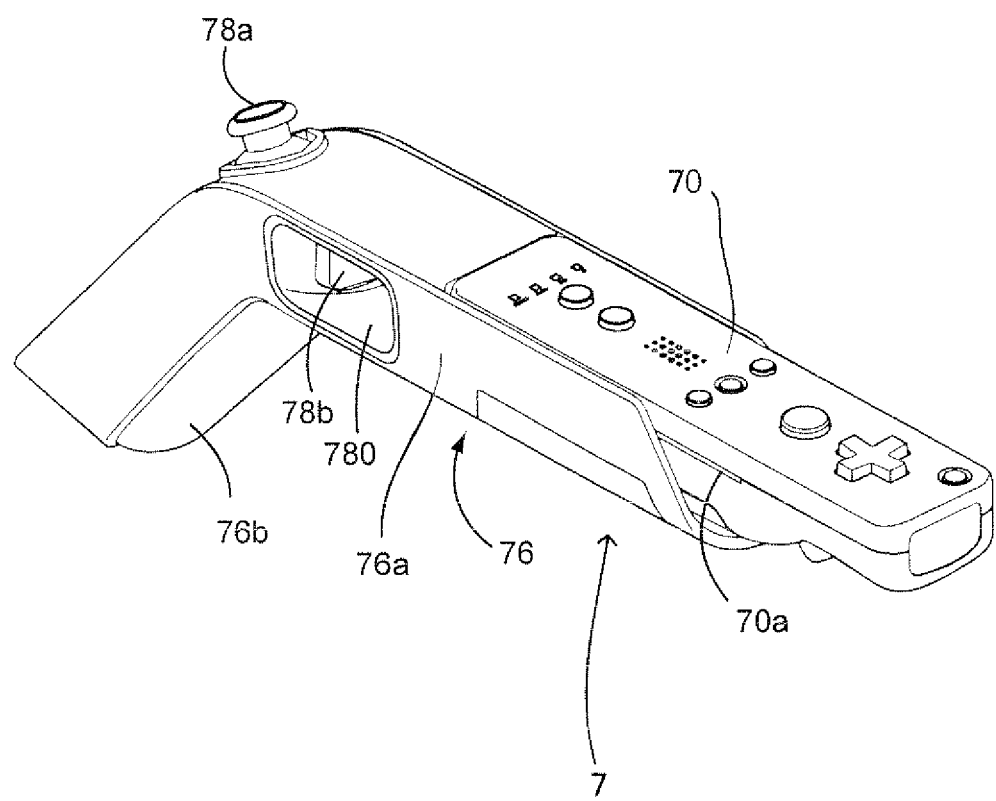
FIG. 3 is a perspective view of the controller shown in FIG. 1.
Figure 4:
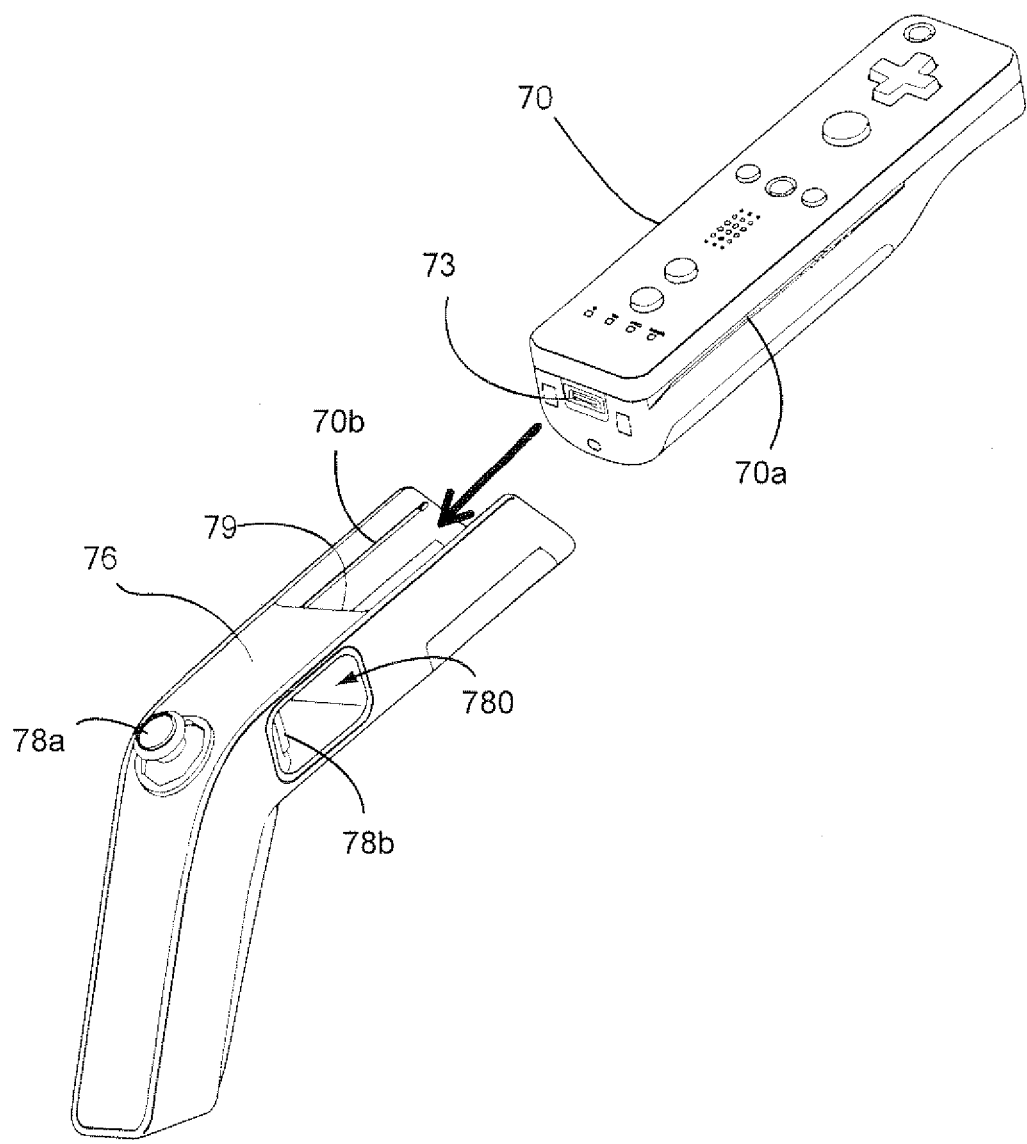
FIG. 4 is a perspective view showing a core unit of the controller in FIG. 3 separated from a sub-unit.

One non-limiting example of a controller 7 is explained hereafter, with reference to FIG. 3 and FIG. 4. FIG. 3 is an oblique view showing an external-view structure of the controller 7. FIG. 4 is an oblique view showing a state where the core unit 70 of the controller 7 is detached from the sub-unit 76.

In FIG. 3, the controller 7 comprises the core unit 70 which is one example of a first control unit, and the sub-unit 76 which is one example of a second control unit to which the core unit 70 can be mounted in a freely detachable manner. Built into the core unit 70 are electronic components and multiple control switches necessary for functioning as a controller for the game machine 3. The sub-unit 76 has a housing shaped to simulate a gun and thus includes a gun barrel portion 76a and a gripper portion 76b. Formed on the barrel portion of the housing is a laterally arranged penetrating hole or aperture) 780 which penetrates the side of the barrel, and installed inside the penetrating hole is a control switch member 78b which can be pushed inwardly, in a direction toward the gripper portion 76b. Also, an analog stick 78a which can point in 360-degree directions (i.e., a universal stick) is installed on a shoulder section where the barrel portion and the gripper portion are joined at an angle. In this embodiment, the core unit 70 mounted to the sub-unit 76, functions as a controller for the game machine 3.

Figure 8A:
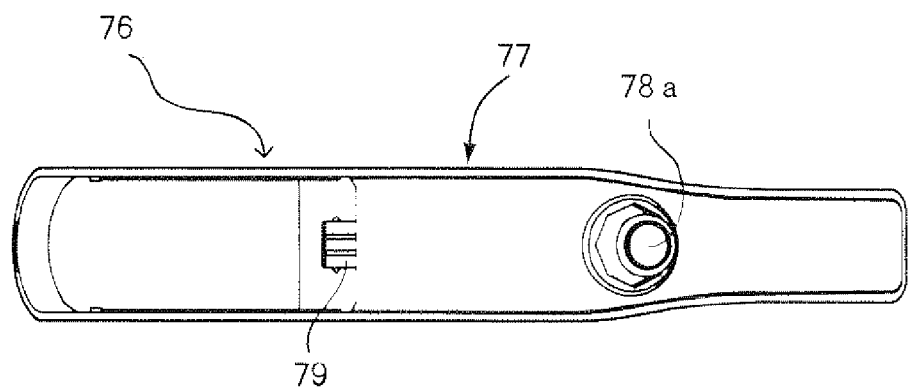
FIG. 8a is a top plan view of the sub-unit shown in FIG. 4.

In FIG. 4, a connector 73 is shown installed on the back end of the core unit 70. The barrel portion 76a of the housing of the sub-unit 76 incorporates an open slot or recess that is concave or U-shaped in section, enabling insertion of the core unit 70 into the sub-unit 76. The concave section has at least a length which can support more than half the length of the core unit 70. Also, installed at the rearward end of the concave section is a connector 79 (FIG. 8a) adapted to align with the connector 73 in the core unit. When the core unit 70 is inserted into the open slot or recess in the sub-unit, the connector 79 fits with the connector 73. As a result, the core unit 70 and the sub-unit 76 become electrically connected. Also, grooves 70a are installed on opposite sides of the core unit 70, and elongated ribs or projections 70b are provided in the concave section of the sub-unit 76. By the grooves and ribs fitting with each other, the core unit 70 and the sub-unit 76 become physically connected, preventing their relative positions from deviating when mounted. Therefore, when mounting the core unit 70 in the sub-unit 76, the core unit 70 is inserted to the concave section of the sub-unit 76 along the grooves 70a until the connector 73 and the connector 79 engage with each other, after which the core unit 70 and the sub-unit 76 will not separate from each other under normal operating conditions.

Figure 5:
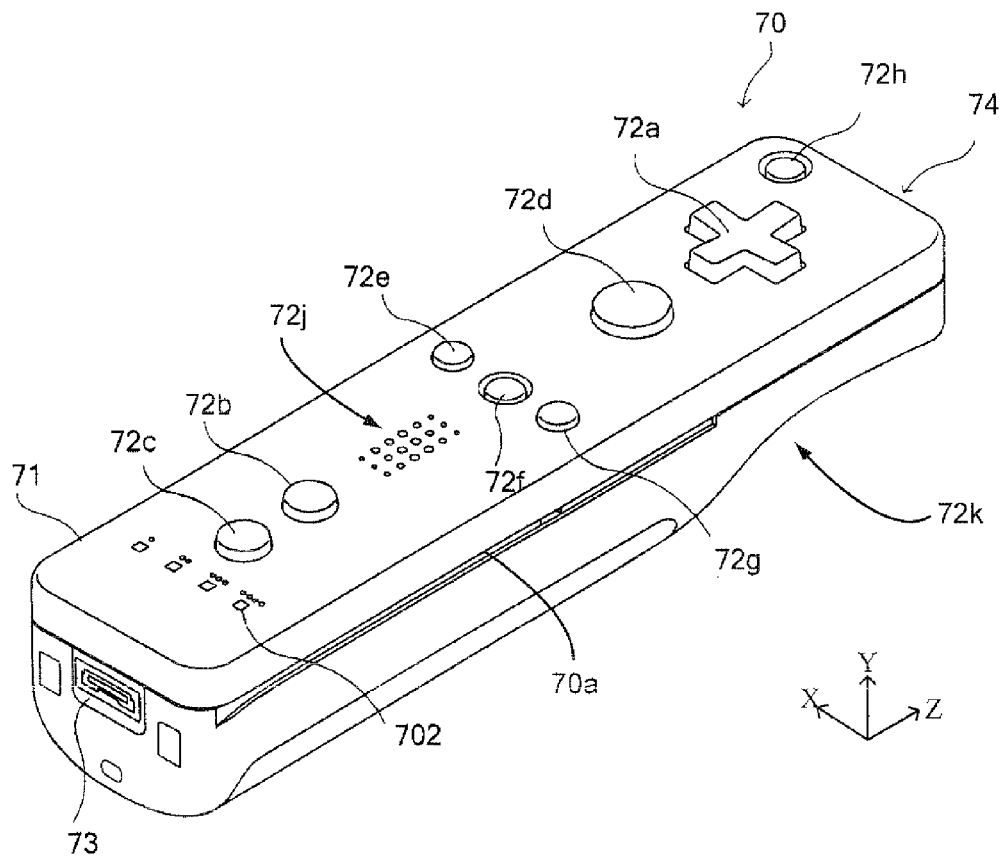
FIG. 5 is an upper right rear perspective view of the core unit shown in FIG. 3.
Figure 6:
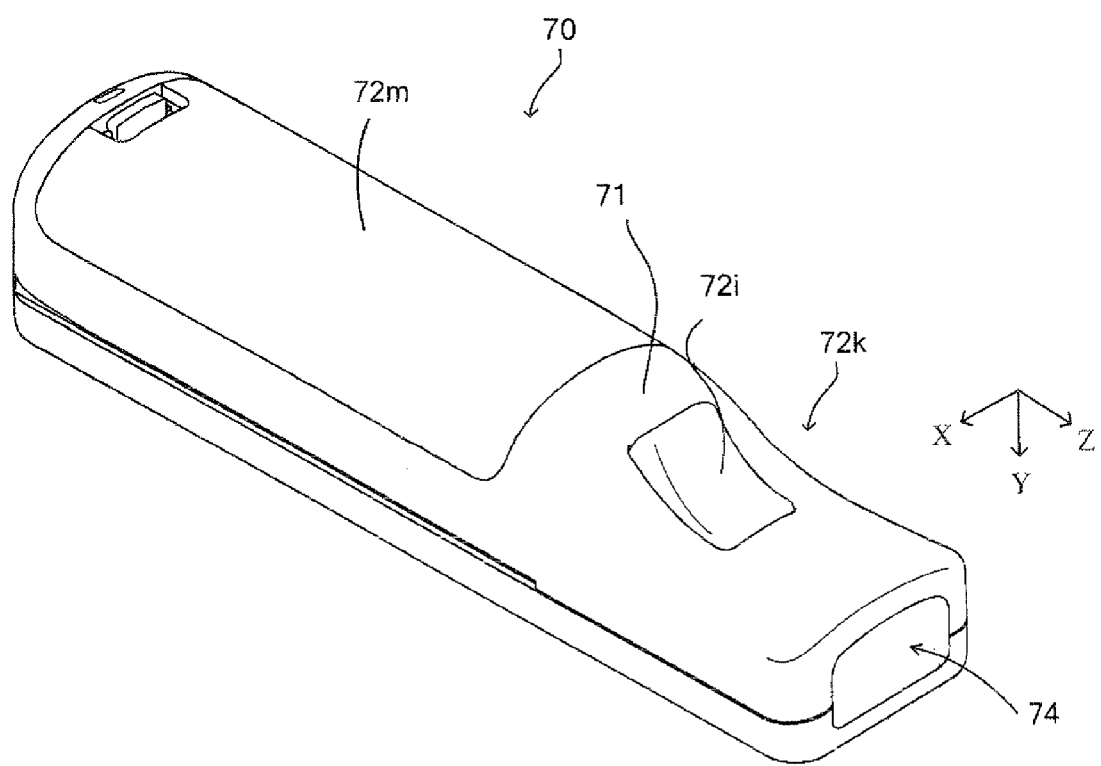
FIG. 6 is a lower left front perspective view of the core unit shown in FIG. 3.

Core unit 70 is now explained hereafter with reference to FIG. 5 and FIG. 6. FIG. 5 is an oblique view of the core unit 70 from the upper rear. FIG. 6 is an oblique view of the core unit 70 from the lower front.

The core unit 70 has a housing 71 formed by plastic molding for example. The housing 71 has a near-rectangular shape, elongated in the front-to-rear direction, and is sized so that it can be held with one hand of an adult or a child. The core unit 70 is a control unit which can also be used as a stand-alone controller or as the gun-type controller 7, when attached to the sub-unit 76.

A cross key 72*a* is installed on the front center of the top face of the housing 71. This cross key 72*a* is a cross-type, four-direction, push switch, wherein control sections corresponding to four directions (front, rear, left, and right) are arranged on the projecting pieces of a cross at a 90-degree interval. By pressing one of the control sections of the cross key 72*a*, one of the front, rear, left, and right directions is selected. For example, by the player controlling the cross key 72*a*, he can instruct 4-8 moving directions of player characters appearing in a virtual game world and instruct the cursor moving direction.

While the cross key 72*a* is a control unit which outputs a control signal according to the player's direction input operation, it may be a control unit of other shapes. For example, instead of a cross key 72*a*, a compound switch may be installed which combines a push switch with four-direction control sections in a ring shape and a center switch installed in the center of the ring. Also, instead of the cross-key 72*a*, a control unit may be installed which outputs a control signal according to the direction in which a universal stick projecting from the top face of the housing 71 is inclined. Furthermore, instead of the cross key 72*a*, a control unit may be installed which outputs a control signal corresponding to the sliding direction of a disk-shape member which can move horizontally. Other alternatives to the switch key include a touch pad or plural switches, each of which indicates one of at least four directions (front, rear, left, and right) and outputs a control signal according to the switch pressed by the player.

Multiple control buttons 72*b*-72*g* are installed rearwardly of the cross key 72*a* on the top face of the housing 71. The control buttons 72*b*-72*g* constitute a control unit which outputs a control signal assigned to each of the control buttons 72*b*-72*g* by the player pressing the head of each button. For example, the control buttons 72*b*-72*d* are assigned functions designated for "button No. 1," "button No. 2," and the "A button," respectively. Also, the control buttons 72*e*-72*g* are assigned functions designated for the "− button", the "Home button," and the "+ button", respectively. Control buttons 72*b*-72*g* are assigned their respective functions according to the game program executed by the game machine 3. Because they have no direct relationship with the explanation of the present invention, a detailed explanation of the various button functions is not necessary.

In the arrangement example shown in FIG. 5, the control buttons 72*b*-72*d* are installed along the central front-to-rear direction on the top face of the housing 71. Also, the control buttons 72*e*-72*g* are installed between the control buttons 72*b* and 72*d* along the left-to-right direction on the top face of the housing 71. The control button 72*f* has its top face recessed in the top face of the housing 71 such that a player cannot inadvertently press down on the button. Also, a control button 72*h* is installed in the front side of the cross key 72*a* on the top face of the housing 71. The control button 72*h* is a power switch which remotely turns on/off the power of the game machine 3 main body. Control button 72*h* also has its top face recessed in the top face of the housing 71.

Multiple LEDs 702 are installed to the rear of the control button 72*c* on the top face of the housing 71. Each controller 7 is assigned a controller classification (number) to distinguish it from other controllers 7. For example, the LED 702 is used for notifying the player of the controller classification currently set to the controller 7. Specifically, when transmission data is sent from the core unit 70 to the reception unit 6, among the multiple LEDs 702, the LED in the position corresponding to the controller classification lights up.

Also, sound release holes 72*j* for releasing sound form a speaker described hereafter (see speaker 706 in FIG. 7) are formed between the control button 72*b* and the control buttons 72*e*-72*g* on the top face of the housing 71.

A concave or recessed section 72*k* is formed in the forward end of the housing bottom. As will become clear in the later description, this concave section is formed in a position permitting the player's index finger or middle finger to be located when the player holds the core unit 70 alone. A control button 72*i* is installed on an inclined face behind said concave section. The control button 72*i* is a control unit which functions as the "B button" for example, used as the trigger switch in shooting games or for operations to let the player object pay attention to a specified object. Attached behind the control button 72*i* is the cover 72*m* of a battery storage area in which to store batteries, for example.

Also, installed on the front end of the housing 71 is an imaging chip which constitutes a part of an imaging information operating unit 74. The imaging information operating unit 74 is a system for analyzing image data taken by the core unit 70 to determine the location of a specified brightness and detect its position, size, etc. in the image, which has a sampling cycle up to about 200 frame/sec to allow tracing and analyzing even relatively high-speed motions of the core unit 70. The detailed structure of this imaging information operating unit 74 is described further herein.

Figure 7A:
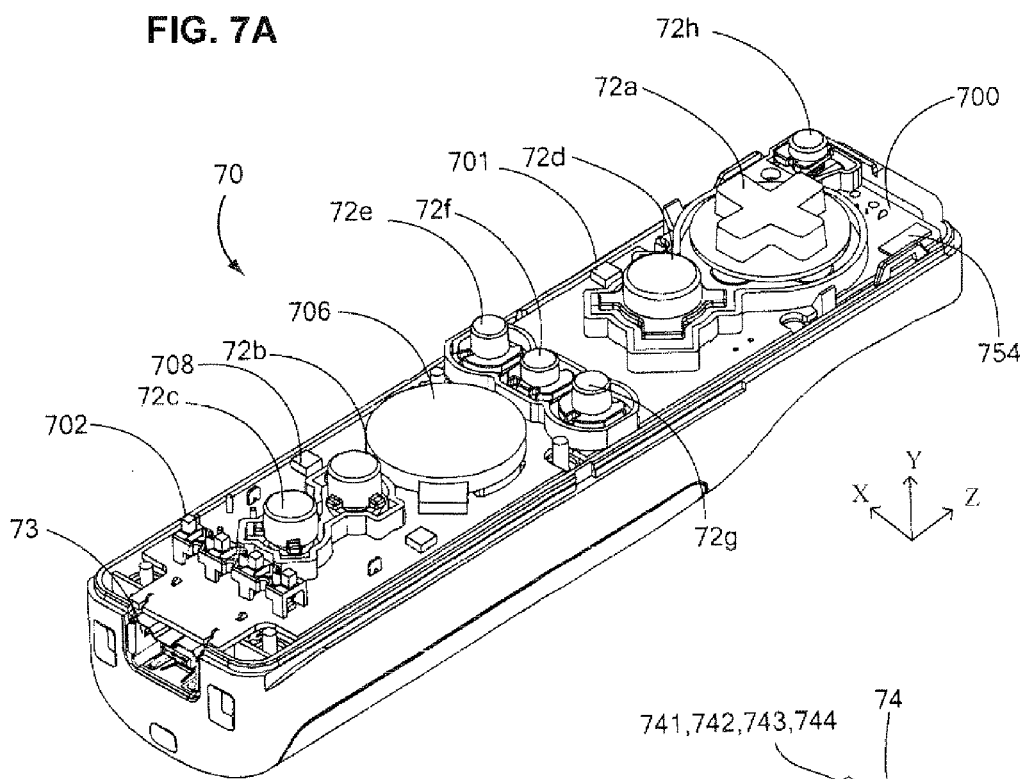
FIG. 7a is a perspective view showing upper enclosure of the core unit removed.
Figure 7B:
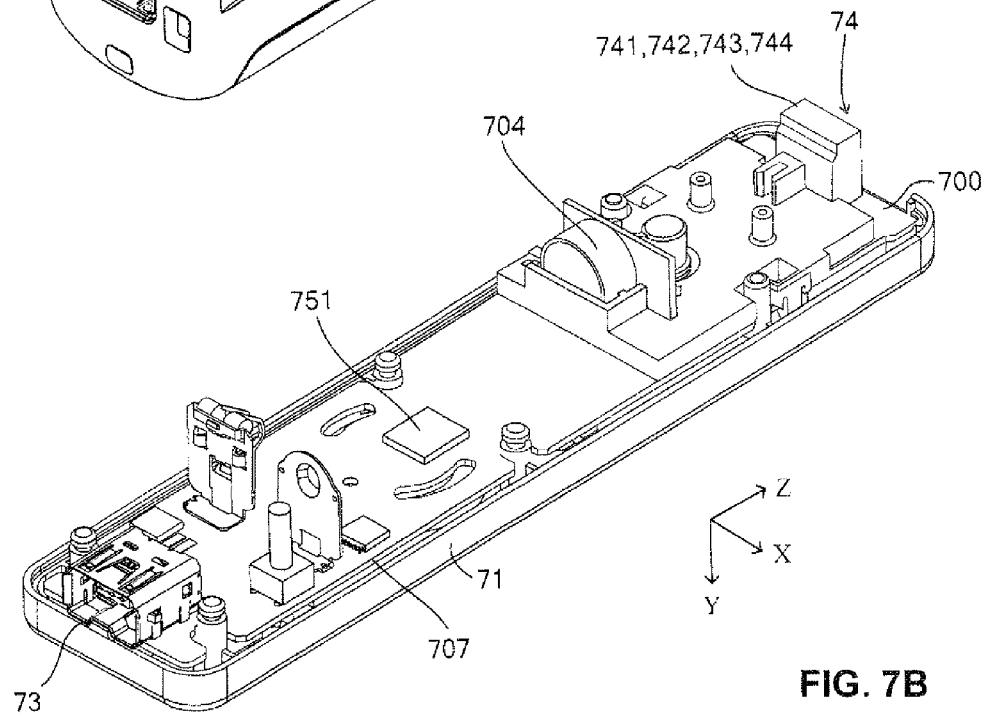
FIG. 7b is an inverted perspective view of the core unit with both the upper and lower enclosure portions removed.

The internal structure of the core unit 70 is explained hereafter, with reference to FIG. 7(*a*) and FIG. 7(*b*). FIG. 7(*a*) is an oblique view where the upper enclosure portion (a part of the housing 71) of the core unit 70 is removed. FIG. 7(*b*) is an oblique view showing the underside of the unit with the lower enclosure (a part of the housing 71) removed.

In FIG. 7(*a*), the circuit board 700 is fixed inside the lower enclosure portion of the housing 71, and installed on the top main surface of the circuit board are control buttons 72*a*-72*h*, an acceleration sensor 701, LEDs 702, an antenna 754, etc. These are connected to a microcomputer 751 via a wiring (not shown) formed on the circuit board 700. Also, the core unit 70 functions as a wireless controller with a wireless module (not shown in FIG. 7 but see FIG. 10) and the antenna 754. A quartz oscillator (not shown) is installed inside the housing 71, generating the basic clock for the microcomputer described hereafter. Also, a speaker 706 and an amplifier 708 are installed on the top main face of the circuit board 700. By the acceleration sensor 701 being installed not on center, but on the periphery of the circuit board 700, according to the rotation around the length direction of the controller as an axis, acceleration containing the centrifugal force component can be detected in addition to changes in the direction of gravitational acceleration. Therefore, the controller rotation can be determined with a good sensitivity from the detected acceleration data by a specified calculation.

The imaging information operating unit 74 is installed on the front end of the bottom of the circuit board 700. The imaging information operating unit 74 comprises an infrared filter 741, a lens 742, an imaging chip 743, and an image processing circuit 744 sequentially from the front of the core unit 70, each of which is also attached to the bottom of the circuit board 700. Also attached to the bottom of the circuit board 700 are the connector 73, a sound IC 707 and the microcomputer 751. The sound IC 707 is connected with the microcomputer 751 and an amplifier 708 via wiring formed on the circuit board 700 etc. and outputs sound signals to the speaker 706 via the amplifier 708 according to the sound data sent from the game machine 3. A vibrator 704 is also attached to the bottom face of the circuit board 700. This vibrator 704 is a vibrating motor or a solenoid, for example, Because vibration is generated in the core unit 70 by the vibrator 704, the vibration is transmitted to the player's hand, realizing a so-called vibration-enabled game. Because the vibrator 704 is placed relatively toward the front of the housing 71, and with the housing 71 vibrating while the player is holding it, the vibration is easily felt by the player.

Figure 8B:
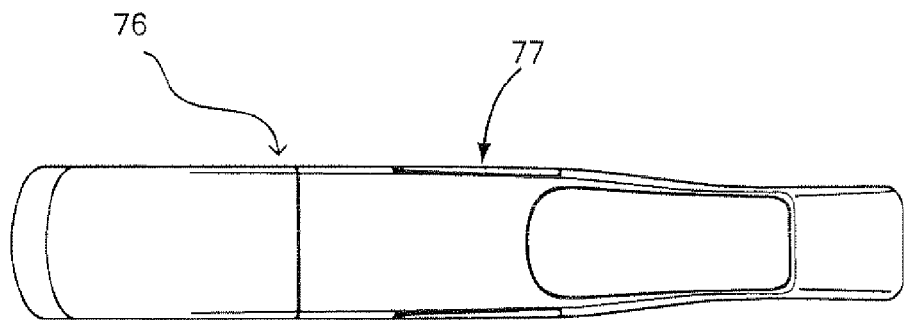
FIG. 8b is a bottom plan view of the sub-unit shown in FIG. 4.
Figure 8C:
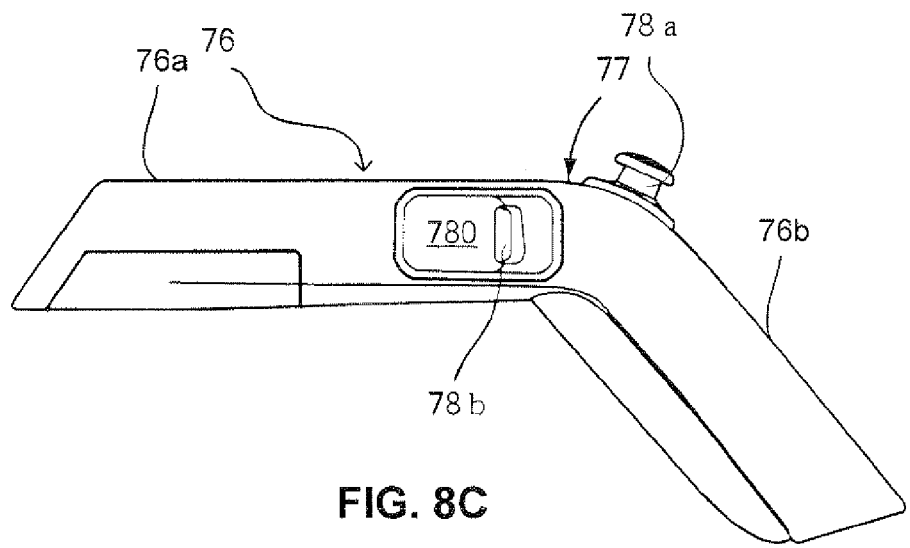
FIG. 8c is a left side elevation of the sub-unit shown in FIG. 4.
Figure 9:
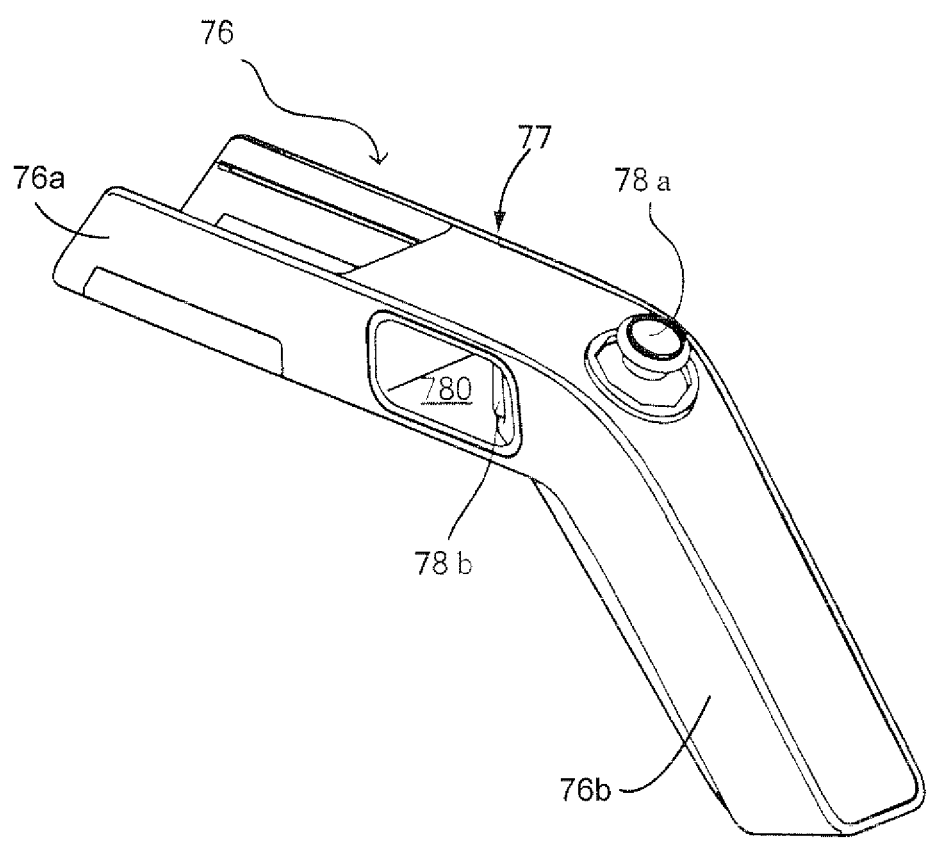
FIG. 9 is a left rear perspective view of the sub-unit shown in FIG. 4.

The sub-unit 76 is explained in detail hereafter with reference to FIG. 8 and FIG. 9. FIG. 8(*a*) is a top view of the sub-unit 76, FIG. 8(*b*) is a bottom view of the sub-unit 76, and FIG. 8(*c*) is a left-side view of the sub-unit 76. FIG. 9 is an oblique view from the upper rear of the sub-unit 76.

The sub-unit 76 has a housing 77 formed by plastic molding for example. The housing 77 approximately has a guntype shape, wherein its left-to-right direction as the whole corresponds to the barrel direction when seen from the side (see FIG. 8 (*b*)). The housing 77 includes the barrel portion 76*a* and the gripper portion 76*b* formed at a specified angle to the barrel portion 76*a*. Also, when the housing 77 is seen from the top side, the gripper portion is formed narrower than the barrel portion (see FIGS. 8(*a*) and (*b*)). While in this embodiment the barrel portion 76*a* and the gripper portion 76*b* are formed as one continuous member, other embodiments may be constituted by connecting independent members at a specified angle. The gripper portion 76*b* of the sub-unit 76 is sized to enable it to be held with one hand of an adult or a child. Although the sub-unit 76 has a shape imitating a gun even by itself, it is a control unit for enabling the entire functionality of the gun-type controller 7 by further mounting the core unit 70 on the barrel portion as described above.

Formed on the barrel portion 76*a* is the concave or U-shaped section which supports the core unit 70 when the core unit 70 is inserted therein. Inside this concave section, the connector 79 is installed on the rear end, to which the connector 73 installed on the rear end of the core unit 70 can be connected. Also, the penetrating hole or aperture 780 which penetrates the side of the barrel portion 76*a* is formed rearward of concave section but still within the barrel portion. Installed on the gripper-side face inside this penetrating hole 780 is the control switch 78*b* which is a key top, an example of a first control switch member that can be pushed in a direction toward the gripper portion. While the control switch 78*b* is constituted as described above, it may be any switch that can be operated with an index finger, such as a switch having a control member of a key or trigger shape that can be pushed in.

On the top face of the housing 77, the stick 78*a*, which is an example of the second control switch, is installed on a part connecting the barrel portion 76*a* to the gripper portion 76*b*. The stick 78*a* is a universal stick member projecting from the top face of the housing 77 which can be inclined in any direction, and is a control unit which outputs a control signal according to the inclination direction and the inclination angle thereof. For example, an arbitrary direction or position can be specified by a player inclining the stick tip in an arbitrary direction of 360°, which can be utilized for instructing the moving direction of a player character appearing in a virtual game world or the moving direction a cursor. Also, the moving speed of a player character or a cursor can be specified according to the inclination angle. While the stick 78*a* is a control unit which outputs a control signal according to said player's direction input operation, it may be a control unit of other shapes. For example, it may be a cross key similar to the cross key 72*a*.

Figure 10:
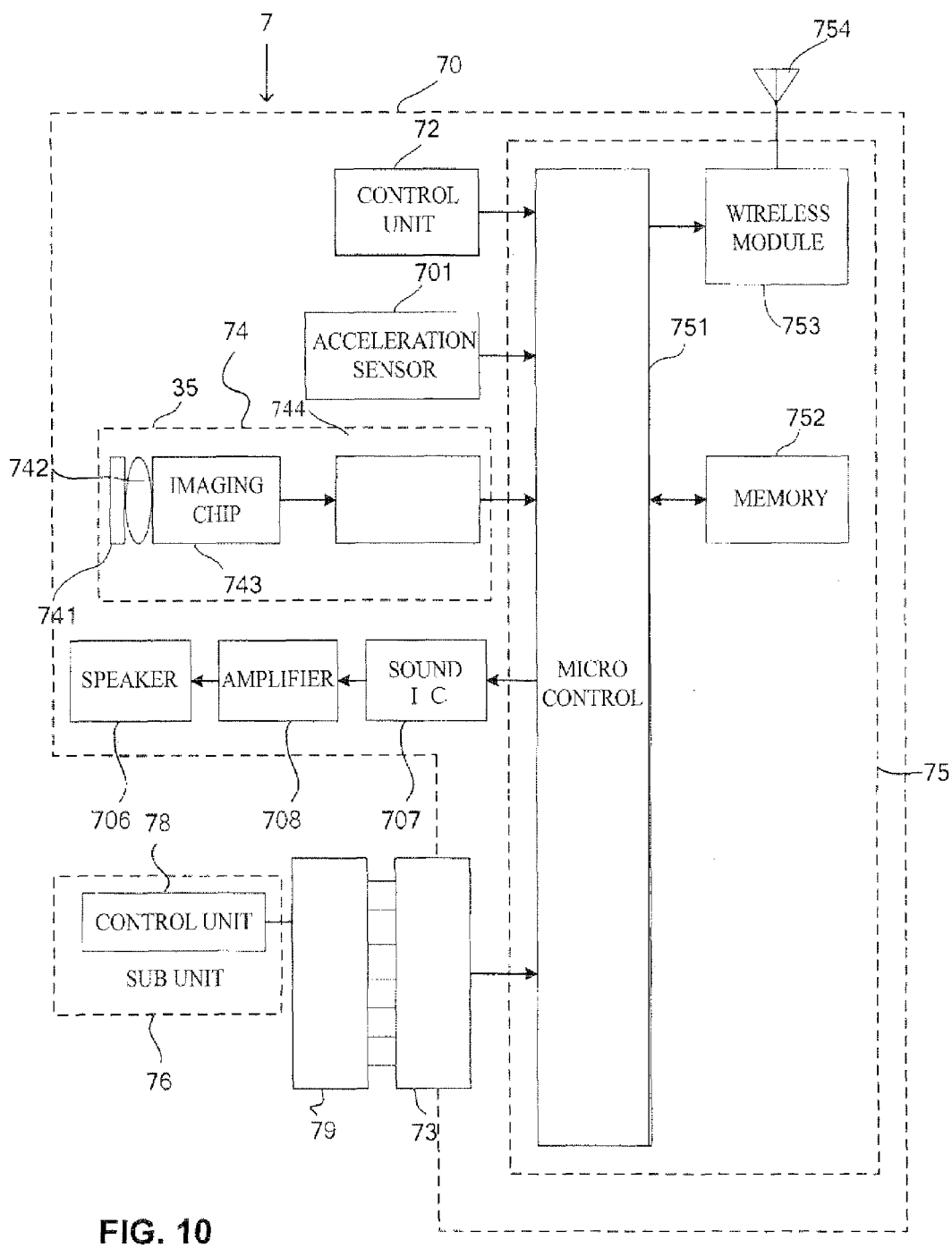
FIG. 10 is a block diagram showing the structure of the controller shown in FIG. 3.

Next, the internal structure of the controller 7 is explained referring to the block diagram in FIG. 10.

In FIG. 10, the core unit 70 is equipped with a communication unit 75, the acceleration sensor 701, a control unit 72 and the imaging information operating unit 74.

The imaging information operating unit 74 contains an infrared filter 741, a lens 742, an imaging chip 743, and an image processing circuit 744. The infrared filter 741 transmits only infrared ray out of incident light from the front of the core unit 70. The lens 742 condenses infrared light transmitted by the infrared filter 741 and beams it to the imaging chip 743. The imaging chip 743 is a solid-state imaging chip such as a CMOS sensor or a CCD for example, and images the infrared light condensed by the lens 742. Therefore, the imaging chip 743 images only the infrared light transmitted by the infrared filter 741 to generate image data. The image data generated by the imaging chip 743 are processed in the image processing circuit 744. Specifically, the image processing circuit 744 processes the image data obtained from the imaging chip 743 to detect high-brightness portions, and outputs processing result data showing the result of detecting their position coordinates and areas to the communication unit 75. The imaging information operating unit 74 is fixed on the housing 71 of the core unit 70, wherein its imaging direction can be changed by changing the direction of the housing 71 itself. As will become clear in the later description, based on the processing result data output from this imaging information operating unit 74, signals according to the position or movement of the core unit 70 can be obtained.

It is preferred that the acceleration sensor 701 be a three-axis acceleration sensor. The three-axis acceleration sensor 701 detects linear accelerations in three directions, namely the up-down direction, the left-right direction, and the front-rear direction. Also, in other embodiments, a two-axis acceleration detection means may be used which detects linear accelerations only along the up-down and the left-right directions (or another pair of directions). For example, the three-axis or two-axis acceleration sensor 701 may be a type obtainable from Analog Devices, Inc. or ST Microelectronics N. V. It is preferred that the acceleration sensor 701 be a capacitance type (capacitance compound form) based on the MEM (Micro Electro Mechanical systems) technology with silicon fine processing. However, the three-axis or two-axis acceleration sensor 701 may be provided using an existing technology of acceleration detection means (piezoelectric type or piezoelectric resister type) or another appropriate technology developed in the future.

As is publicly known to one skilled in the art, the type of acceleration detection means used in the acceleration sensor 701 can detect only the acceleration along a line (linear acceleration) corresponding to each axis of the acceleration sensor.

Namely, the direct output from the acceleration sensor 701 is a signal indicating a linear acceleration (static or dynamic) along each of the two axes or three axes. Therefore, the acceleration sensor 701 cannot directly detect physical characteristics such as a motion along a non-linear path (circular for example), a rotation, a spin motion, an angular position, an inclination, a position, and an attitude.

However, it would be easily understood by one skilled in the art that further information on the core unit 70 can be estimated or computed by performing additional processing on acceleration signals output from the acceleration sensor 701. For example, static acceleration (gravitational acceleration) is detected when the core unit 70 is still. The degree of gravitational acceleration acting on each axis component can be known from acceleration data output from the acceleration sensor 701 at this time. Because it is already known how the acceleration sensor 701 is attached to the core unit 70, the relative inclination relationship between the gravity direction and the acceleration sensor 701 becomes known. Namely, if the acceleration sensor 701 is attached horizontally to the core unit 70, the inclination of the object (core unit 70) relative to the gravity vector can be estimated using the output from the acceleration sensor 701. In this manner, the inclination, attitude, or position of the core unit 70 can be determined by combining the acceleration sensor 701 with the microcomputer 751 (or another processor). In the same way, when the core unit 70 equipped with the acceleration sensor 701 is moved with a user's hand by being dynamically accelerated as explained herein, by processing generated acceleration signals detected by the acceleration sensor 701, various motions and/or positions of the core unit 70 can be computed or estimated. In another embodiment, the acceleration sensor 701 may be equipped with a built-in signal processing device or another kind of dedicated processing device for performing a desired processing on acceleration signals output from a built-in acceleration detection means before outputting a signal to the microcomputer 751. For example, if the acceleration sensor detects static acceleration (gravitational acceleration for example), the built-in or dedicated processing device may convert the detected acceleration signal into the corresponding inclination angle. Data showing the acceleration detected by the acceleration sensor 701 are output to the communication unit 75.

In another embodiment, instead of the acceleration sensor 701 a gyro sensor containing a rotor or an oscillator may be used. As an example of MEMO gyro sensor used in this embodiment, there is one obtainable from Analog Devices, Inc. Unlike the acceleration sensor 701, the gyro sensor can directly detect rotation (or angular velocity) centering on at least one gyro element it contains. In this way, because a gyro sensor and an acceleration sensor are basically different, depending on which device is selected for each purpose, the processing performed on the output signals from these devices needs to be changed appropriately.

Specifically, if inclination and attitude are computed using a gyro sensor instead of an acceleration sensor, a large change is made. Namely, when using a gyro sensor, the inclination value is initialized in starting the detection. Then, the angular velocity data output from the gyro sensor are integrated. Next, the amount of change in inclination is computed from the initialized inclination value. In this case, the computed inclination corresponds to the angle. On the other hand, when computing inclination using an acceleration sensor, because inclination is computed by comparing the value of each axis component of gravitational acceleration with a specified reference, the computed inclination can be expressed in a vector, thus an absolute direction can be detected using the acceleration detection means without initialization. Also, while the nature of values computed as inclination is an angle if a gyro sensor is used, it is vector if an acceleration sensor is used. Therefore, if a gyro sensor is used instead of an acceleration sensor, a specified conversion needs to be performed on the inclination data considering the difference between the two devices. Because the properties of a gyroscope are publicly known to one skilled in the art as well as the basic difference between an acceleration detection means and a gyroscope, further details are omitted in this specification. While a gyro sensor has an advantage that it can directly detect rotation, in general an acceleration sensor has an advantage of having a better cost efficiency if applied to a controller such as the one used in this embodiment.

The communication unit 75 contains the microcomputer (micom) 751, a memory 752, a wireless module 753, and the antenna 754. The micom 751 controls the wireless module 753 which wirelessly transmits transmission data while utilizing the memory 752 as a storage area during processing.

Control signals (control data) from the control unit 72, acceleration signals (acceleration data) from the acceleration sensor 701, and processing result data from the imaging information operating unit 74 installed in the core unit 70 are output to the micom 751. Also, control signals (control data) from the control unit 78 installed in the sub-unit 76 are output via the connectors 73 and 79 to the micom 751. The micom 751 temporarily stores the input data (control data, acceleration data, and processing result data) as transmission data to be sent to the reception unit 6. Here, while wireless transmission from the communication unit 75 to the reception unit 6 is performed at every specified cycle, because it is a general practice to perform game processing with 1/60 second as the unit, data need to be collected and sent with a shorter cycle. Specifically, the game processing unit is about 16.7 ms (1/60 second), and the transmission interval of the Bluetooth™ communication unit 75 is 5 ms. When transmission timing to the reception unit 6 is received, the micom 751 outputs the transmission data stored in the memory 752 as a series of control data, and outputs them to the wireless module 753. Then the wireless module 753 modulates carrier wave of a specified frequency with these series of control data using the Bluetooth™ technology for example, and radiates the extremely low power radio signal from the antenna 754. Namely, control data from the control unit 72 installed in the core unit 70, control data from the control unit 78 installed in the sub-unit 76, acceleration data from the acceleration sensor 701, and processing result data from the imaging information operating unit 74 are modulated into extremely low power radio signals in the wireless module 753 and radiated from the core unit 70. Then, extremely low power radio signals are received by the reception unit 6 of the game machine 3, and through demodulating and decoding the extremely low power radio signals in the game machine 3, a series of control data (control data, acceleration data, and processing result data) can be obtained. Then, the CPU 10 of the game machine 3 performs game processing based on the obtained control data and a game program. In structuring the communication unit using the Bluetooth™ technology, the communication unit 75 can be equipped with a function to receive transmission data wirelessly sent from other devices.

Figure 11:
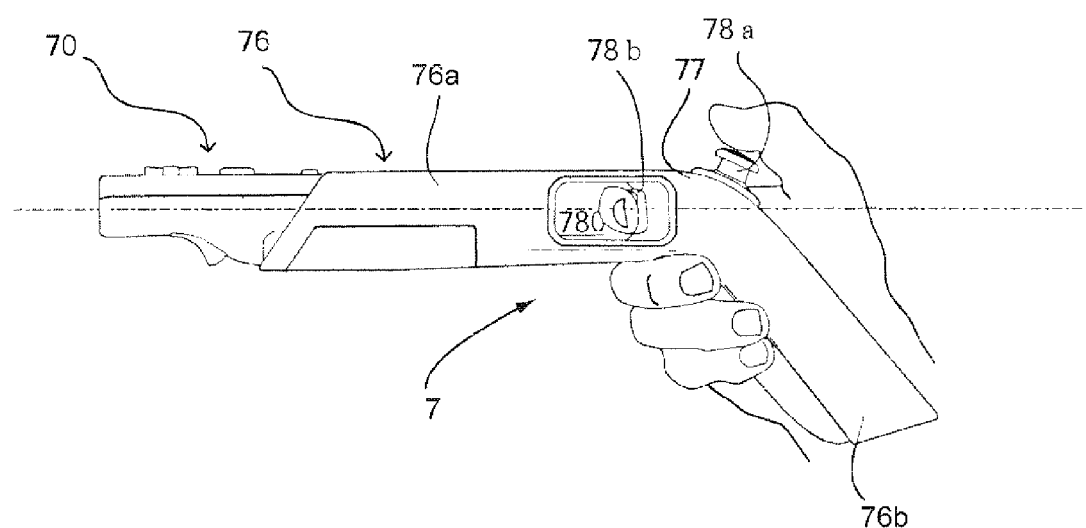
FIG. 11 illustrates a player holding the controller with the right hand viewed from the left side of the core unit.
Figure 12:
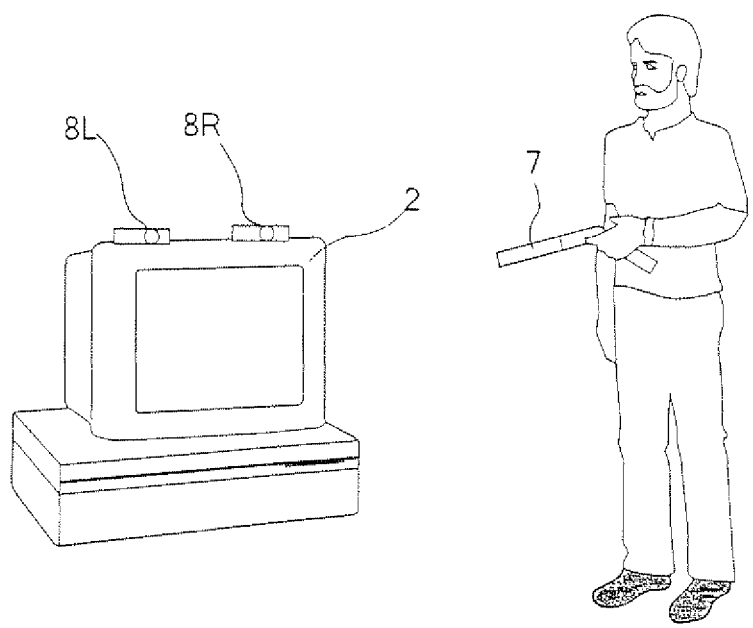
FIG. 12 illustrates a player operating the game using the controller.

FIG. 11 shows the controller 7 held with a right hand of the player. Also, FIG. 12 illustrates a game operation performed using the controller 7 in association with the monitor 2.

As shown in FIG. 11, in order for a player to play a game, the controller 7 (with the core unit 70 mounted on the sub-unit 76) is held with one hand. Specifically, the gripper portion 76b of the sub-unit 76 is held with the player's palm, middle finger, third finger, and little finger. In this state, the index finger is inserted into the penetrating hole or aperture 780 which is formed within a range operable with the index finger. Furthermore, the thumb is placed on the stick 78a. In such a holding state, the player can support the barrel consisting of the barrel portion 76a of the sub-unit 76 and the core unit 70 by putting them on the middle finger, and can firmly hold the controller 7 even while operating the control switch 78b by sandwiching the barrel portion 76a between the index finger and the middle finger. Therefore, the controller 7 can be stably held even when the control key 78b is operated during a game operation.

Also, the index finger is placed inside the barrel portion, even if the thumb is placed on the stick 78a installed on the top face of the housing 77 for an operation, and because the distance between those fingers becomes smaller compared with that for a normal gun shape, the movable range for the fingers becomes wider, making the operation easier.

Furthermore, as shown with an alternate long and short dash line in FIG. 11, because the index finger is placed on a line or axis passing inside the barrel portion, it is easy to recognize the direction in which the controller is pointing from the feeling of the hand, even without aligning the line of view to the barrel position as in an actual gun. Although in an actual gun it is structurally impossible to install a trigger inside the barrel portion, because the invention of the present application is simply a game controller that imitates a gun, a switch imitating a trigger can be installed inside the barrel, making its operation easier.

The player holds the controller 7 so that the front (incident side of light imaged by the imaging information operating unit 74) of the core unit 70 points to the monitor 2. At the same time, the two LED modules 8L, and 8R installed near the display screen of the monitor 2, each output infrared light toward the front of the monitor 2.

By a player holding the controller 7 so that it points to the monitor 2, infrared light beams output by the two LED modules 81 and 8R enter the imaging information operating unit 74. Then, images of the incident infrared light beams are taken by the imaging chip 743 via the infrared filter 741 and the lens 742, and the taken images are processed by the image processing circuit 744. Here, in the imaging information operating unit 74, position and area information of the LED modules 81 and 8R is obtained by detecting infrared component output from the LED modules 81 and 8R. Specifically, the imaging information operating unit 74 analyzes image data taken by the imaging chip 743, excludes images that cannot be from infrared light from the LED modules 81 and 8R based on the area information, and determines positions with high brightness and the positions of the LED modules 8L and 8R. Then, the imaging information operating unit 74 obtains their determined position coordinates and center of gravity coordinates and output them as the processing result data.

Figure 13:
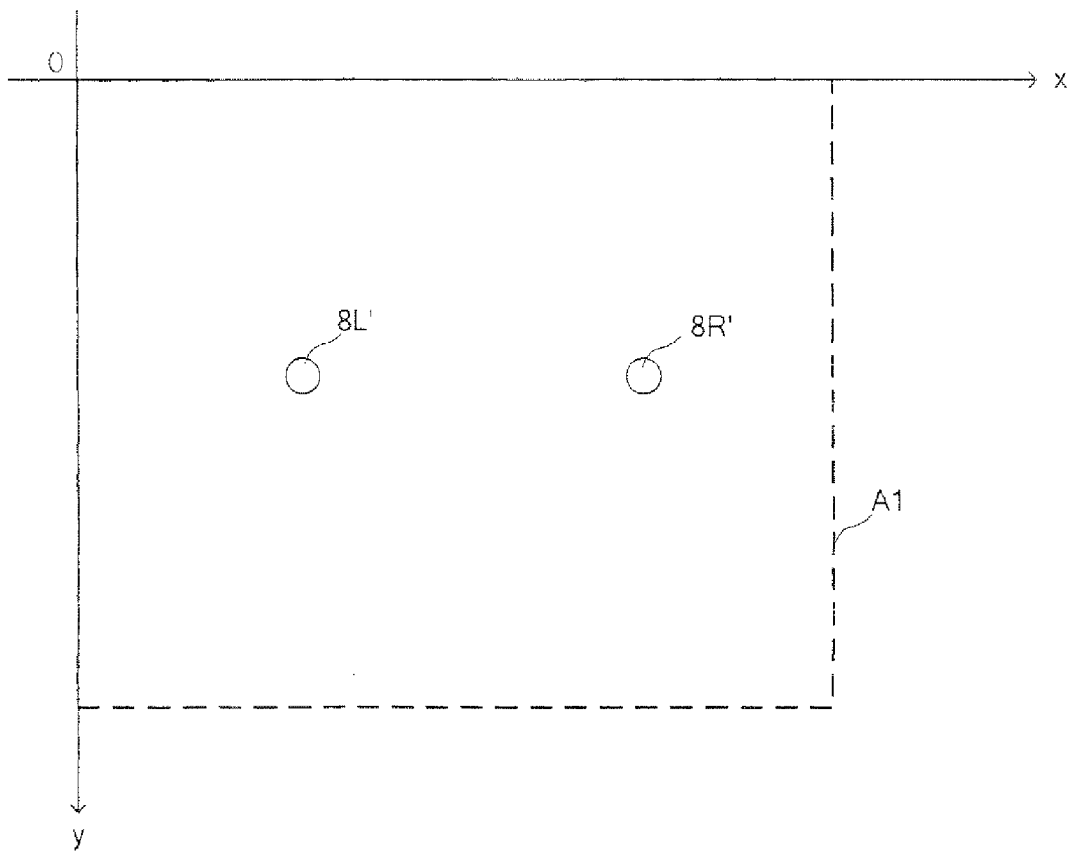
FIG. 13 illustrates images taken by an imaging chip in the controller.

Shown in FIG. 13 is an example of images taken by the imaging chip 743. In FIG. 13, an area A1 shows the range of an image being taken, relative to which image the xy coordinates are set. By pointing the front of the controller 7 to the monitor 2, images 8L' and BR' of the LED modules 81 and 8R are taken, and the position coordinates or the center of gravity coordinates of 8L' and 8R' are expressed in the xy coordinates and are output. By sending this kind of processing result data to the game machine 3, the game machine 3 can obtain control signals related to the movement, attitude, and position of the imaging information operating unit 74, namely the core unit 70, relative to the LED modules 81, and 8R based on the position coordinates and center of gravity coordinates. Specifically, because the positions of high-brightness points in an image sent from the communication unit 75 changes by the core unit 70 being moved, by performing direction input and coordinate input corresponding to the position change of the high-brightness points, direction input and coordinate input along the moving direction of the core unit 70 can be performed.

In this way, by imaging markers (infrared light beams from two LED modules 8L and 8R in the embodiment) installed in a fixed manner by the imaging information operating unit 74 of the core unit 70, control data related to the motion, attitude, and position of the core unit 70 become available for game processing in the game machine 3, and control input becomes more intuitive than using control buttons and control keys pushing buttons. Also, as stated above, because the markers are installed near the display screen of the monitor 2, positions relative to the markers can also be easily converted into the motion, attitude, and position of the core unit 70 relative to the display screen of the monitor. Namely, control data by the motion, attitude, and position of the core unit 70 can be used as a control input directly acting on the display screen of the monitor 2.

Figure 14:
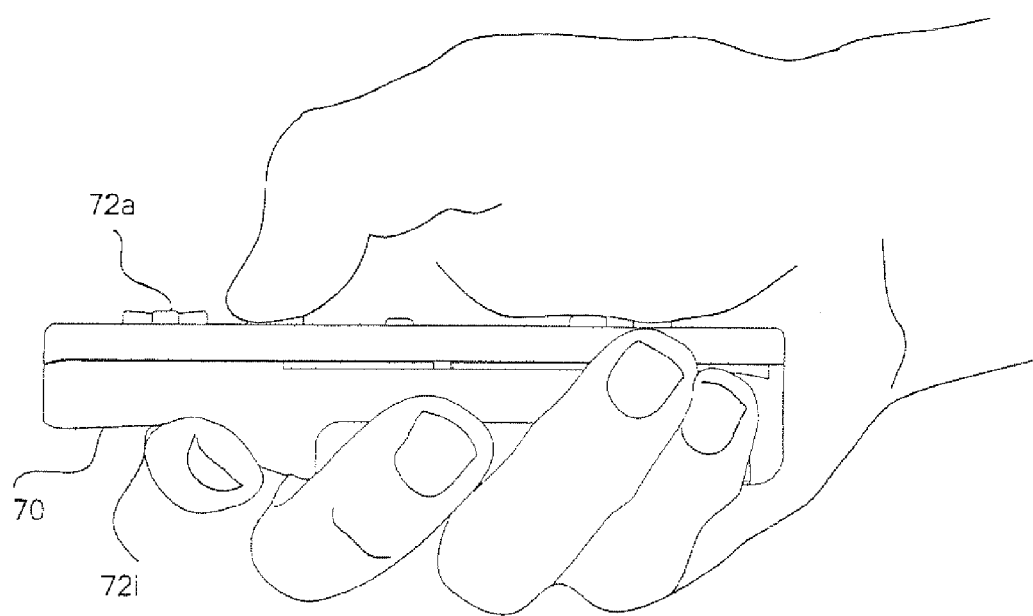
FIG. 14 illustrates a player holding the core unit with the right hand, viewed from the left side of the core unit.
Figure 15:
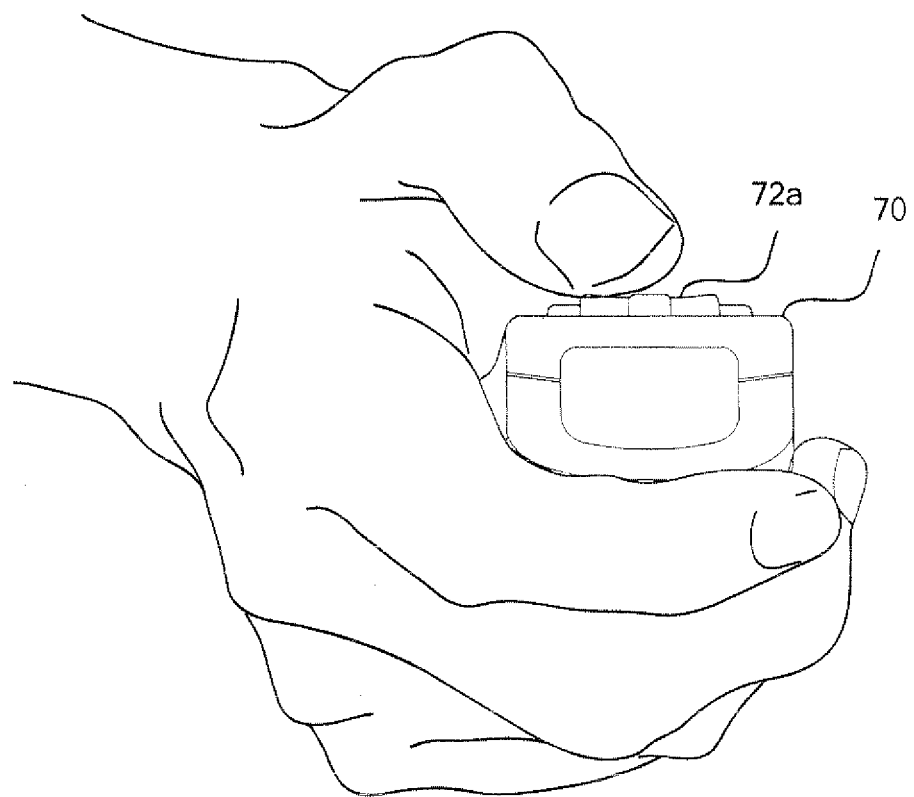
FIG. 15 illustrates a player holding the core unit with the right hand viewed from the front of the core unit.

As stated above, while explanation was given on using the gun-type controller 7 combining the core unit 70 and the sub-unit 76, the core unit 70 can be also used as a controller 7 alone without mounting the sub-unit 76. In that case, although the controller 7 would not imitate a gun, the same kind of controls as in the case of combining them can be performed with a simple controller. FIG. 14 and FIG. 15, illustrate a state where a player holds only the core unit 70 with one hand. FIG. 14 shows the player holding the core unit 70 with the right hand viewed from the left side face of the core unit 70. FIG. 15 shows the player holding the core unit 70 with the right hand viewed from the front of the core unit 70.

As shown in FIG. 14 and FIG. 15, the core unit 70 is sized to enable it to be held with one hand of an adult or a child. Then, when the player's thumb is placed on the top face (near the cross key 72a for example) of the core unit 70, and the player's index finger is placed on the concave section (near the control button 72i for example) on the bottom face of the core unit 70, a light incident port of the imaging information operating unit 74 installed on the front of the core unit 70 becomes exposed in a direction forward or to the front of the player. Needless to say, the core unit 70 can be held in the player's left hand in the same way.

In this way, the player can easily operate the control unit 72 including the cross key 72a and the control button 72i while holding it with one hand. Furthermore, when the player holds the core unit 70 with one hand, because the light incident port of the imaging information operating unit 74 installed on the front of the core unit 70 becomes exposed, infrared light beams from said two LED modules 8L and 8R can be easily taken in through the light incident port. In other words, the player can hold the core unit 70 with one hand without obstructing any function of the imaging information operating unit 74. Moreover, the core unit 70 can be further equipped with a control input wherein the player's hand movement directly acts on the display screen by the player moving the hand holding the core unit 70 relative to the display screen.

As stated above, even with the core unit 70 alone, a pointing operation can be performed using the imaging information operating unit 74, wherein it becomes possible to perform the same operations as in the case of the gun-type controller 7 combining the core unit 70 and sub-unit 76 by using the control button 72i in place of the control switch 78b, and the cross key 72a in place of the stick 78a for example. Therefore, the player can select whether the sub-unit 76 should be mounted to the core unit 70 according to the necessity.

Figure 16:
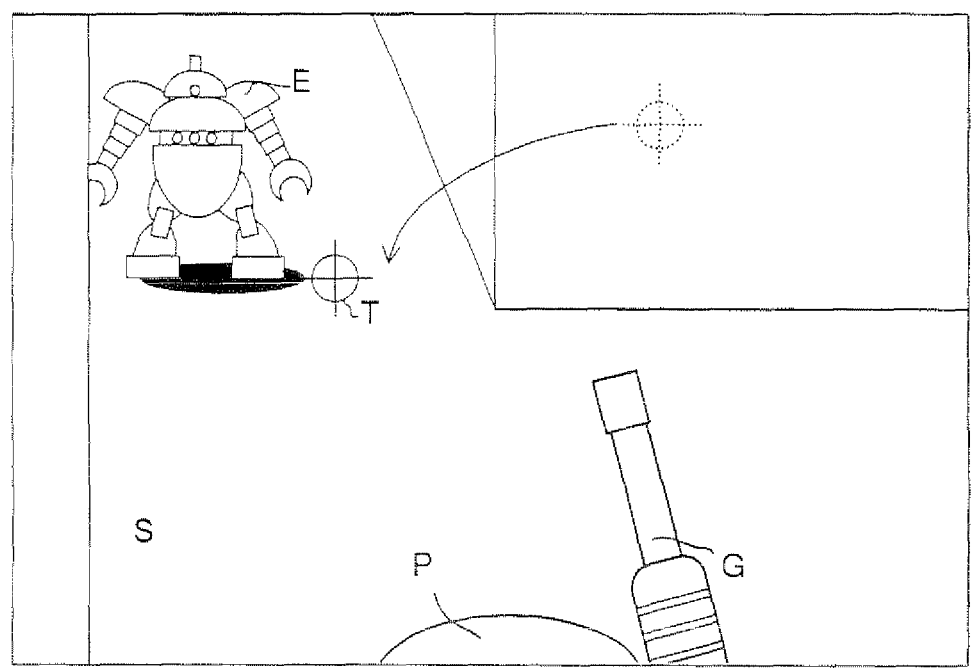
FIG. 16 illustrates a game image displayed on a monitor when a game machine executes a shooting game.

Explained now is an example of operating a game using the gun-type controller in a shooting game. FIG. 16 is a figure showing a game image example displayed on the monitor 2 when the game machine 3 executes the shooting game.

In FIG. 16, a part of a 3-D virtual game space S is displayed on the display screen of the monitor 2. Then, displayed on the display screen as a game object which acts according to the operation of the controller 7, is a part of a player character P and a part of a gun G owned by the player character P. Also, in the virtual game space S displayed on the display screen, a field of view which becomes the front of the player character S is expressed, and an enemy character E is displayed as a shooting target. A sight showing the position for the player character P to shoot with the gun G is displayed as a sight cursor T on the display screen.

In such a shooting game where the game image is displayed on the monitor 2, the player proceeds in the game by operating the controller 7 with one hand. For example, by the player inclining the stick 78a (see FIG. 8 and FIG. 9) installed on the sub-unit 76, the player character P moves in the virtual game space S according to that inclination direction. Also, by the player moving the hand holding the controller 7 relative to the display screen, the sight cursor T moves according to the motion, attitude, and position of the core unit 70 relative to the monitor 7 (LED modules 8L and 8R). Then, by the player pressing down the control key 78b (see FIG. 8 and FIG. 9), the gun G owned by the player character P shoots toward the sight cursor T.

Because the player can use the whole controller 7 as if it were a gun in a shooting game as he uses the stick 78a installed on the sub-unit 76 for instructing the movement of the player character P, excitement of the shooting game further increases.

In the second example, similar to said first example, by a player inclining the stick 78a installed on the sub-unit 76, a player character P moves in a virtual game space S according to that inclination direction. Then, by the player moving the hand holding the core unit 70 relative to the display screen, the gazing point of a virtual camera moves according to the position of the core unit 70 relative to the monitor 2 (LED modules 8L and 8R). By such operations, the player can gaze a position in the virtual game space S to which the core unit 70 is pointed, using the stick 78a for instructing the movement of the player character P.

While the controller 7 and the game machine 3 have been described as connected through wireless communication, the controller 7 and the game machine 3 may also be electrically connected via a cable. In this case, the cable connected to the core unit 70 is connected to a connection terminal of the game machine 3.

Also, while the communication unit 75 was installed only in the core unit 70 among the core unit 70 and the sub-unit 76 structuring the controller 7, a communication unit which wirelessly transmits transmission data to the reception unit 6 may be installed in the sub-unit 76. Also, the communication unit may be installed in each of the core unit 70 and the sub-unit 76. For example, communication units installed in the core unit 70 and the sub-unit 76 may each wirelessly transmit transmission data to the reception unit 6, or transmission data may be wirelessly sent from the communication unit of the sub-unit 76 to the core unit 70 and be received by the communication unit 75 of the core unit 70, and then the communication unit 75 of the core unit 70 may wirelessly transmit the transmission data of the core unit 70 to the reception unit 6 together with the transmission data of the sub-unit 76.

Also, while the explanation was given using the reception unit 6 connected to a connection terminal of the game machine 3 as a reception means to receive transmission data wirelessly sent from the controller 7, the reception means may be comprised of a reception module installed inside the game machine 3 main body. In this case, the transmission data received by the reception module are output to the CPU 10 via a specified bus.

Also, while an explanation was given by having the core unit 70 contain the imaging information operating unit 74 as an example of a detection unit which outputs signals (processing result data) that change according to the movement of the core unit 70 main body, it may be another mechanism. For example, while the core unit 70 contains the acceleration sensor 701 as stated above, a gyro sensor may be used in place of the acceleration sensor 701, and using these detection signals, they can be used as a detection unit which outputs signals that change according to the movement of the core unit 70 main body. In this case, the imaging information operating unit 74 built in the core unit 70 may be removed, or both the sensor and the imaging information operating unit may be combined in the structure.

Also, while explained was a form wherein image data taken by the imaging chip 743 are analyzed to obtain the position coordinates of infrared light images from the LED modules 8L and 8R, and they are generated as processing result data in the core unit 70 and sent to the game machine 3, data in another processing stage may be sent from the core unit 70 to the game machine 3. For example, image data taken by the imaging chip 743 may be sent from the core unit 70 to the game machine 3, and the analysis process may be performed in the CPU 10 to obtain the processing result data. In this case, the image processing circuit 744 installed in the core unit 70 becomes unnecessary. Also, data in the middle of analysis in the image data may be sent from the core unit 70 to the game machine 3. For example, data indicating brightness, position, area, etc. obtained from the image data may be sent from the core unit 70 to the game machine 3, and the remaining analysis process may be performed in the CPU 10 to obtain the processing result data.

Also, while in the above explanation, infrared light beams from two LED modules 8L and 8R were made imaging targets of the imaging information operating unit 74 of the core unit 70, other objects may be made the imaging targets. For example, one or three or more LED modules may be placed near the monitor 2, and infrared light beams from those LED modules may be made the imaging targets of the imaging information operating unit 74. Also, the display screen itself of the monitor 2 or other luminous bodies (such as room lights) may be made the imaging targets of the imaging information operating unit 74. If the position of the core unit 70 relative to the display screen is computed based on the position relationship between the imaging targets and the display screen of the monitor 2, various luminous bodies can be used as the imaging targets of the imaging information operating unit 74.

Also, shapes of said core unit 70 and the sub-unit 76, and shapes, numbers, installation position, etc. of the control units 72 and 78 installed there are merely an example, and needless to say, the present invention can be realized with other shapes, numbers, and installation positions. Also, the game controller of the present invention was explained listing as an example the controller 7 with the sub-unit 76 and the core unit 70 connected. However, the existence of the core unit 70 is not always necessary, and said sub-unit 76 itself was also shown. Also, if the hardware shown in FIG. 10 is mounted on the sub-unit 76, it can also be utilized as a complete replacement for the controller 7.

In this manner, the controller of the present invention made it possible by installing the control switch 78b in a penetrating hole or aperture installed inside the barrel to keep holding the controller stably even during a game wherein the gun-type controller 7 is operated as if it were a gun. Also, by installing the control switch 78b in the penetrating hole installed inside the barrel, even when the stick 78a installed on the top face of the housing 77 is operated simultaneously with the control switch 78b, there is no need to extend one's fingers to operate them, having an advantage of easy operation. Furthermore, because an index finger is placed on a line passing inside the barrel, the direction pointed by the controller 7 can be easily recognized through feeling of the hand without aligning the line of sight to the barrel position as in an actual gun.

FIGS. 17-32 illustrate further examples of receptor devices or sub-units that can be employed to receive or hold core units 70, and it will be appreciated that the various sub-units may or may not include additional control units such as those shown at 72 and 78 described hereinabove. In other words, the sub-units may interface with the core unit as described above, or the subunit may simply hold the core unit with no electronic interface. For example, for some games, button 72i on the core unit 70 may not be required at all, or its function may be carried out by another button as the sub-unit.

Moreover, in some instances, the imaging information unit 74 may not be required (no pointing operations necessary), but the two or three axis acceleration sensor 701 will nevertheless detect movements of the core unit (and hence the sub-unit or receptor) that can be transferred to a game character on a monitor.

Figure 17:
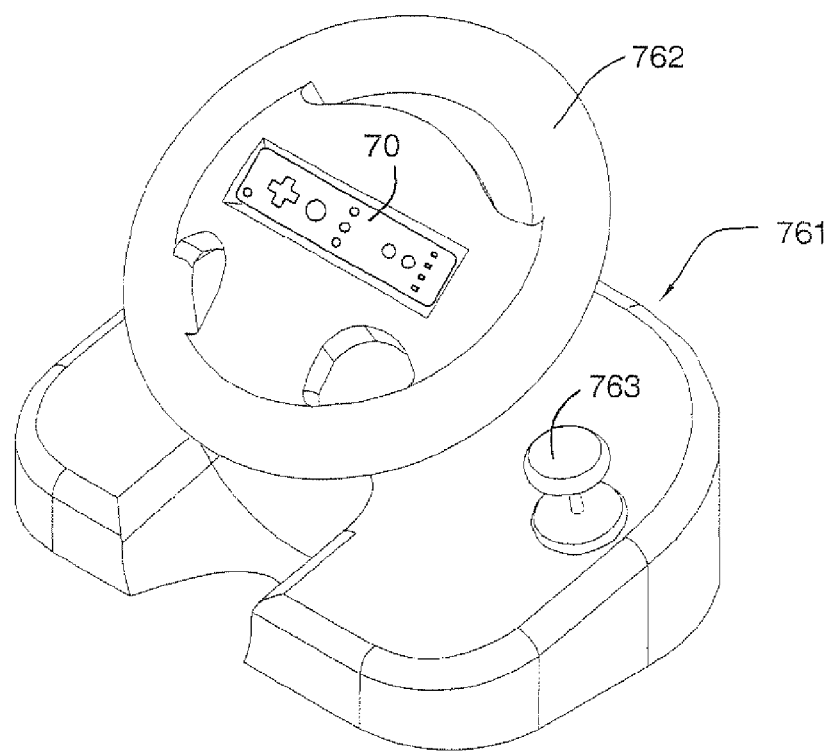
FIG. 17 is an example of the core unit detachably secured to a steering type controller.

More specifically, FIG. 17 illustrates a core unit 70 received within the hub of a video game steering unit 761. The core unit 70 rotates with the wheel 762 and stick 763 on the unit 761 may correspond to stick 78a described above.

Figure 18:
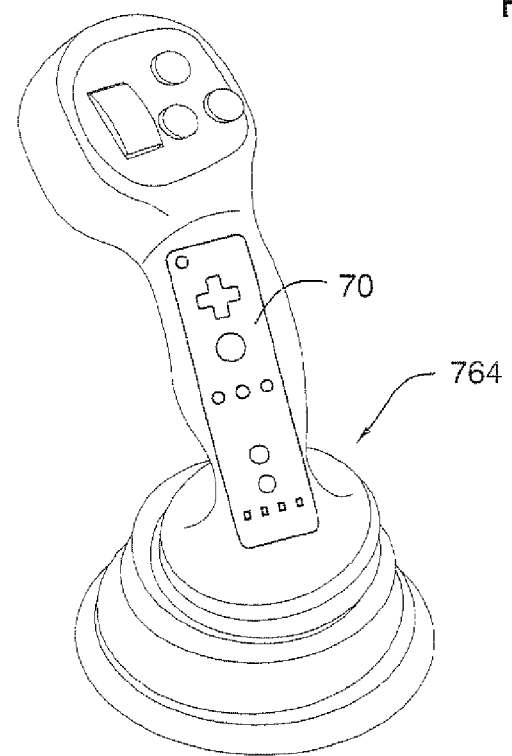
FIG. 18 is an example of the core unit detachably secured to a joystick type device.

FIG. 18 illustrates the core unit 70 received within a recess formed in a video game joystick type device 764.

Figure 19:
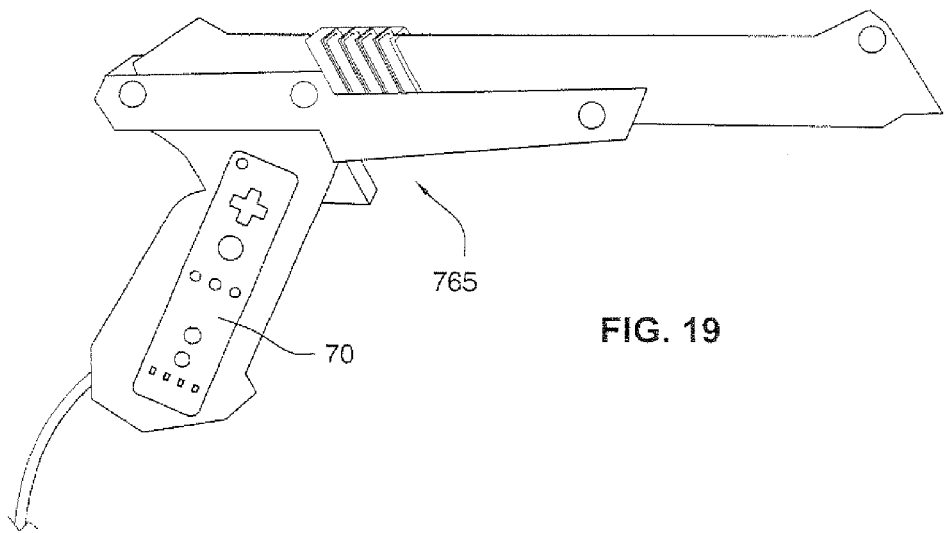
FIG. 19 is an example of a core unit detachably secured to another gun type controller.

FIG. 19 illustrates a core unit 70 received within the handle portion of another gun type video game controller 765.

Figure 20:
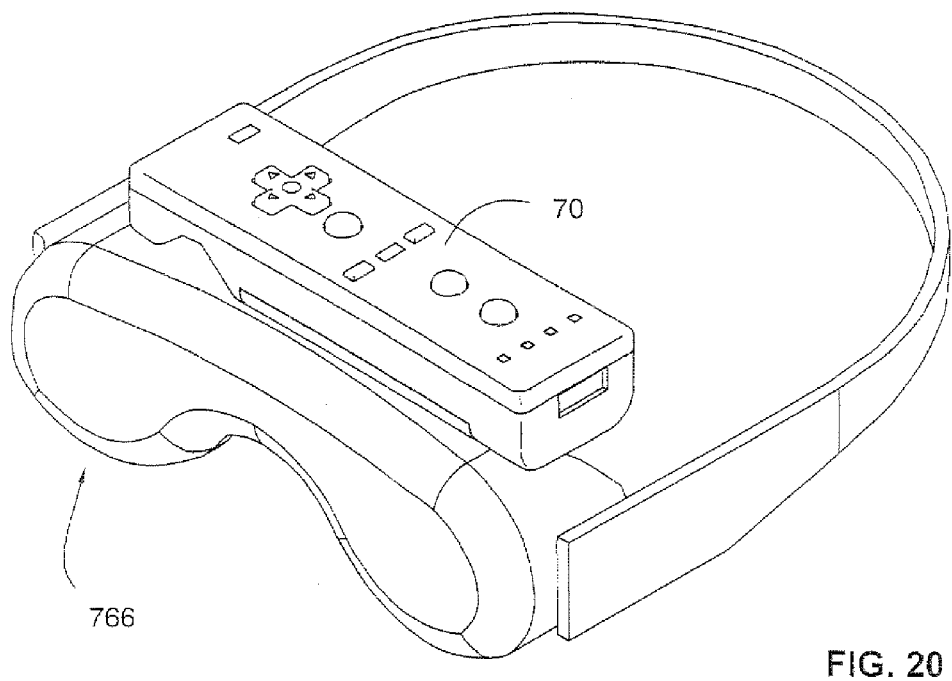
FIG. 20 is an example of a core unit detachably secured along an upper surface of a pair of goggles.

FIG. 20 illustrates a core unit 70 attached along a top of a pair of wearable goggles 766. In this application, the imaging information unit 74 is not required.

Figure 21:
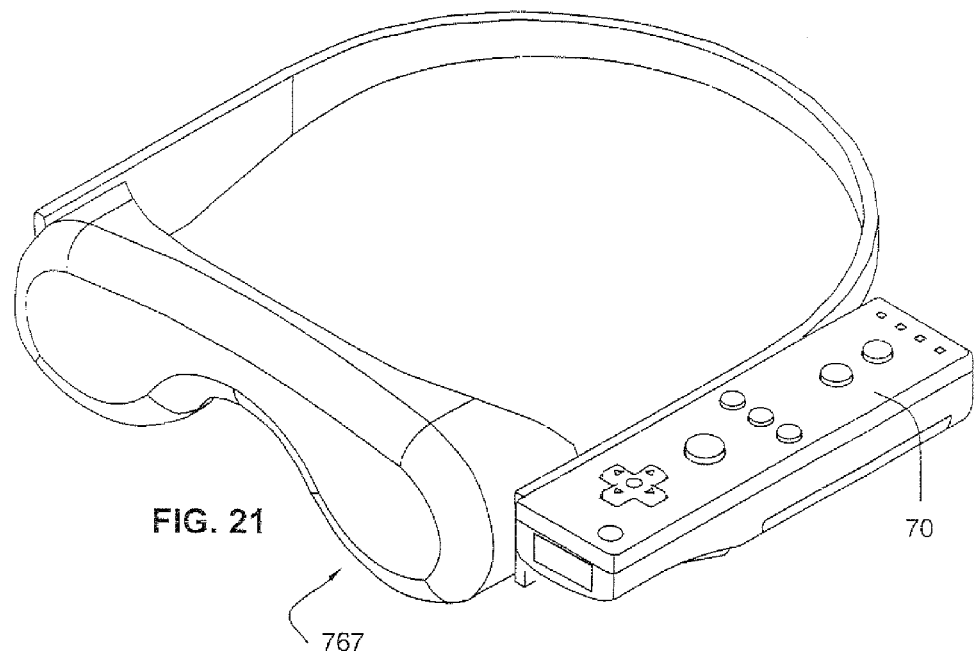
FIG. 21 is an example of a core unit attached to one side of a pair of goggles.

FIG. 21 illustrates a core unit 70 attached along one side of a pair of wearable goggles 767 in an arrangement where the imaging information unit 74 may be utilized if desired.

Figure 22:
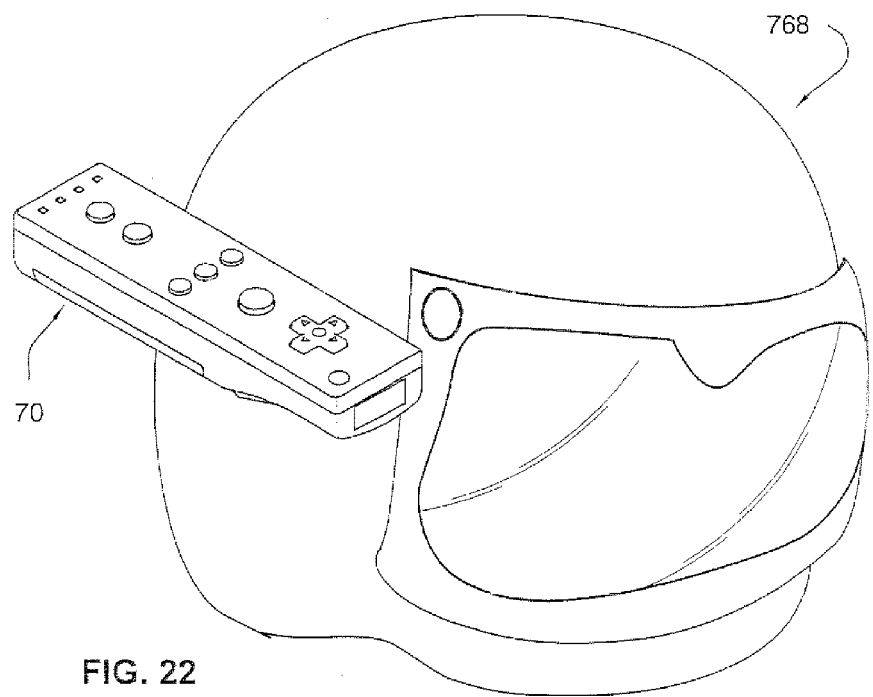
FIG. 22 is an example of a core unit detachably secured along one side of a racing helmet.

FIG. 22 illustrates a core unit 70 secured to one side of a wearable racing or other helmet 768, otherwise similarly arranged as in FIG. 21.

FIG. 23a discloses a core unit 70 received within a recess formed in a simulated baseball bat 769. To facilitate insertion of the core unit 70, the simulated baseball bat is divided into two components, including a handle portion 770 that may be threadably secured to the barrel portion 771.

FIG. 23b illustrates an alternative arrangement wherein the handle portion 772 of a bat incorporates the electronics and control buttons of a core unit 70, with the control buttons accessible on the surface of the handle.

FIG. 24 illustrates a core unit 70 received in the side wall of a rocking seat 773.

Figure 25:
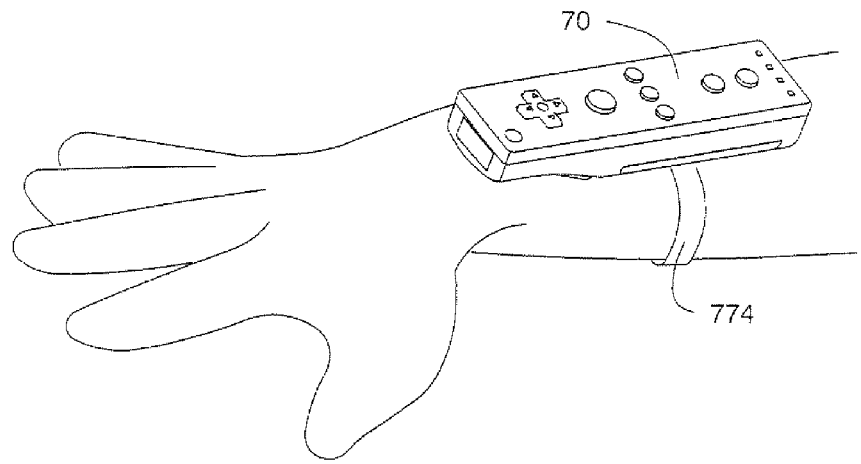
FIG. 25 is an example of a core unit detachably secured to the wrist of a user.

FIG. 25 illustrates a core unit 70 attached to the wrist of a user by means of a strap 774.

Figure 26:
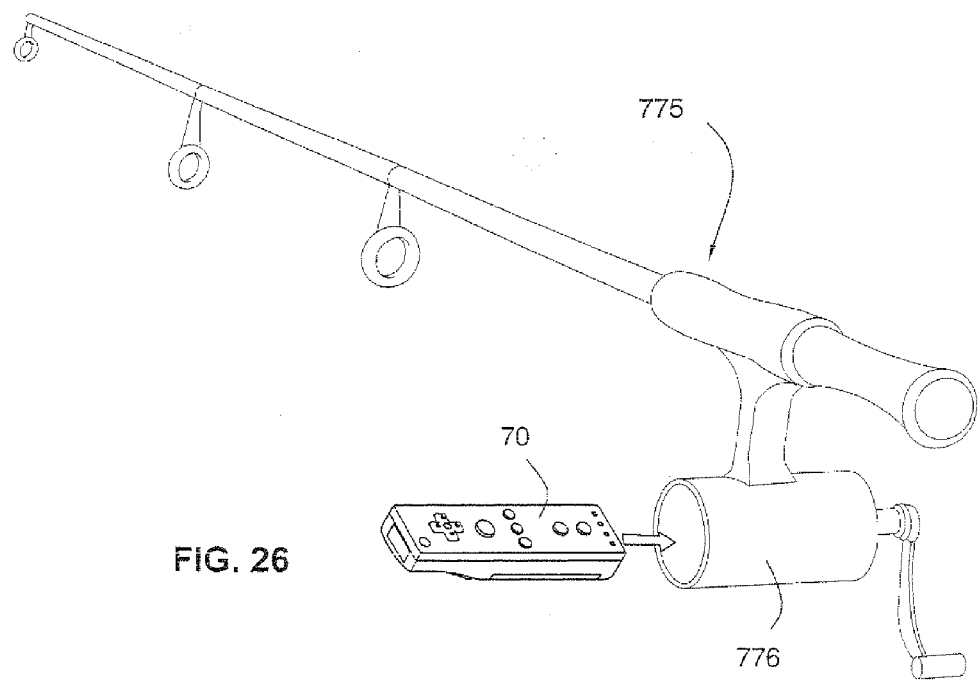
FIG. 26 is an example of a core unit detachably secured within a fishing rod assembly.

FIG. 26 illustrates a core unit 70 attached to a real or simulated fishing rod 775, the core unit 70 received within a hollow cylinder of a real or simulated reel component 776 of the rod.

Figure 27:
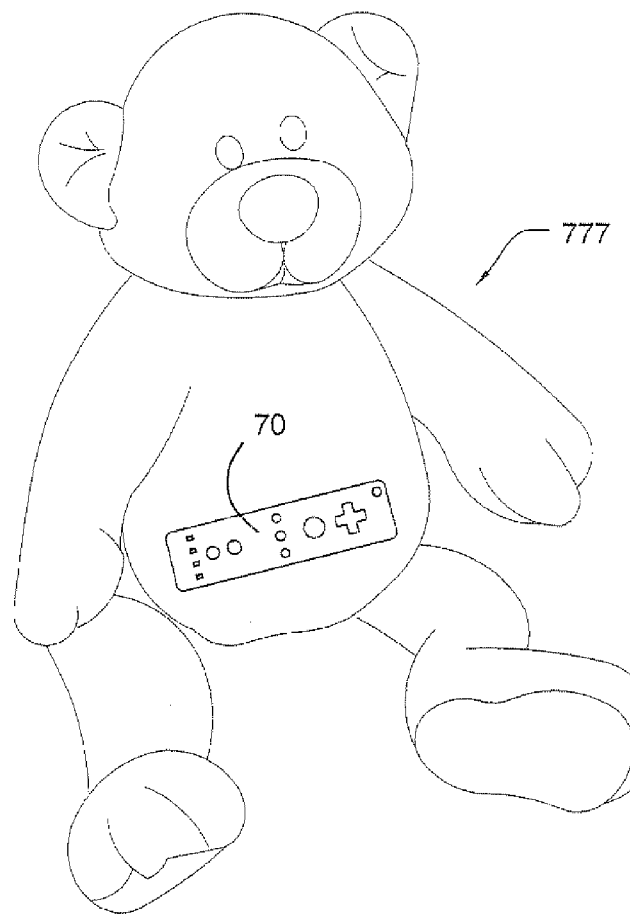
FIG. 27 is an example of a core unit detachably secured to a stuffed toy animal.

FIG. 27 illustrates a core unit 70 received within a stuffed toy animal 777.

Figure 28:
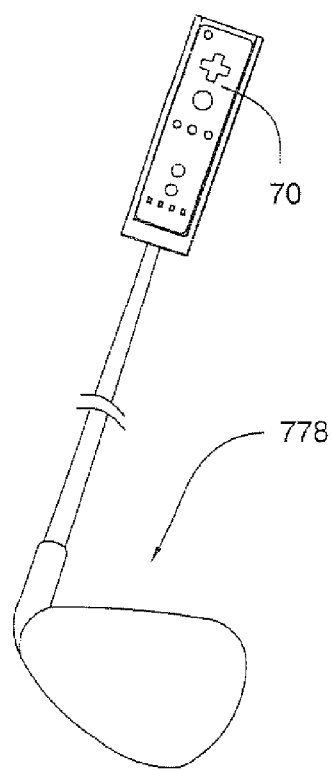
FIG. 28 is an example of a core unit forming a handle portion of a simulated golf club.

FIG. 28 illustrates a core unit 70 forming the handle portion of a real or simulated golf club 778.

Figure 29:
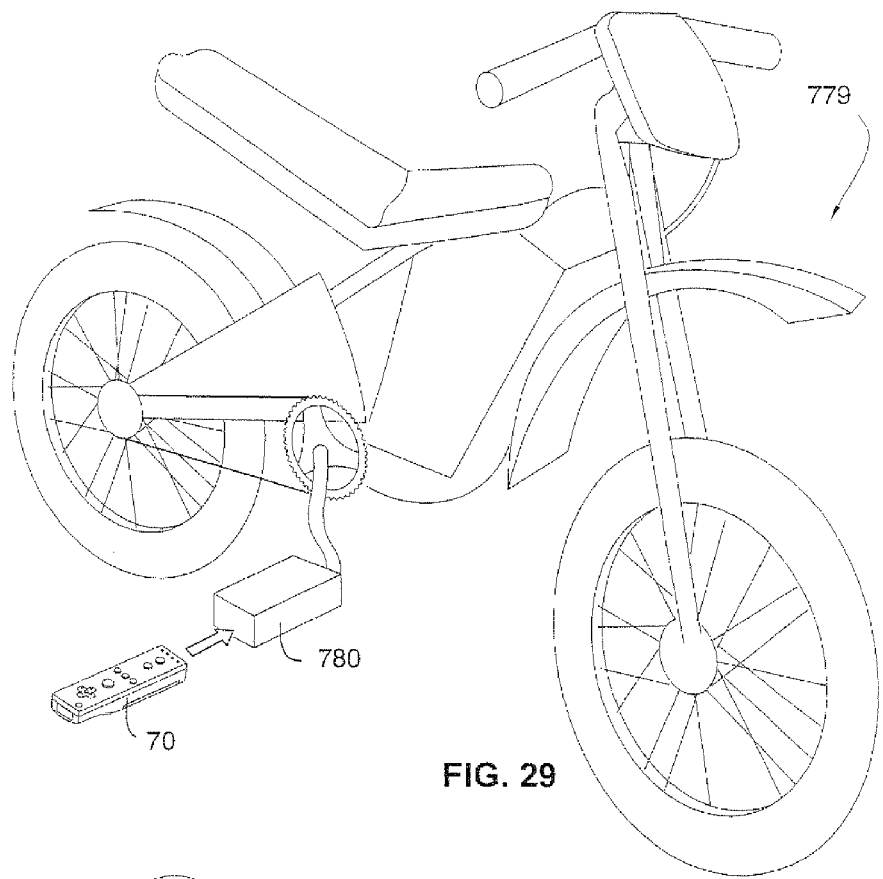
FIG. 29 is an example of a core unit detachably secured within the pedal of a bicycle.

FIG. 29 illustrates a core unit 70 attached to a bicycle 779 and, more specifically, the core unit 70 is received within an otherwise hollow pedal 780.

Figure 30:
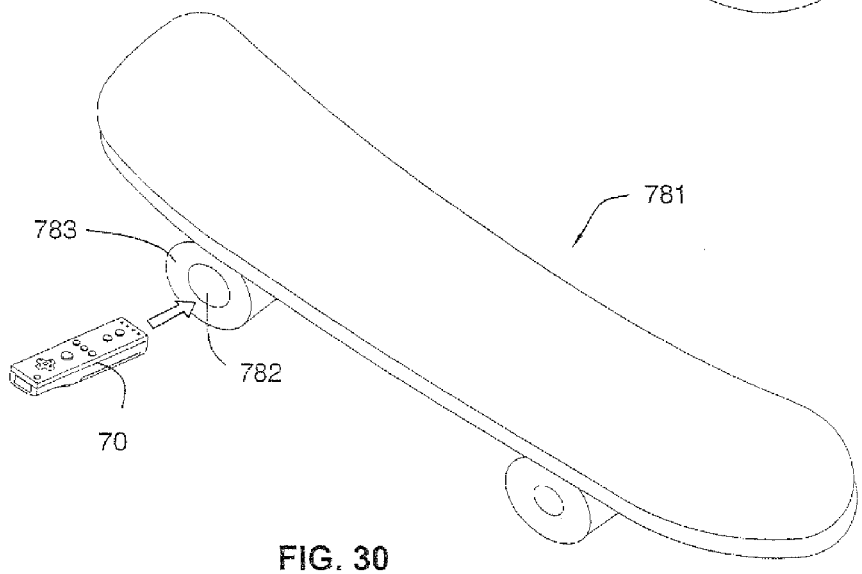
FIG. 30 is an example of a core unit detachably secured within the wheel of a skateboard.
Figure 31:
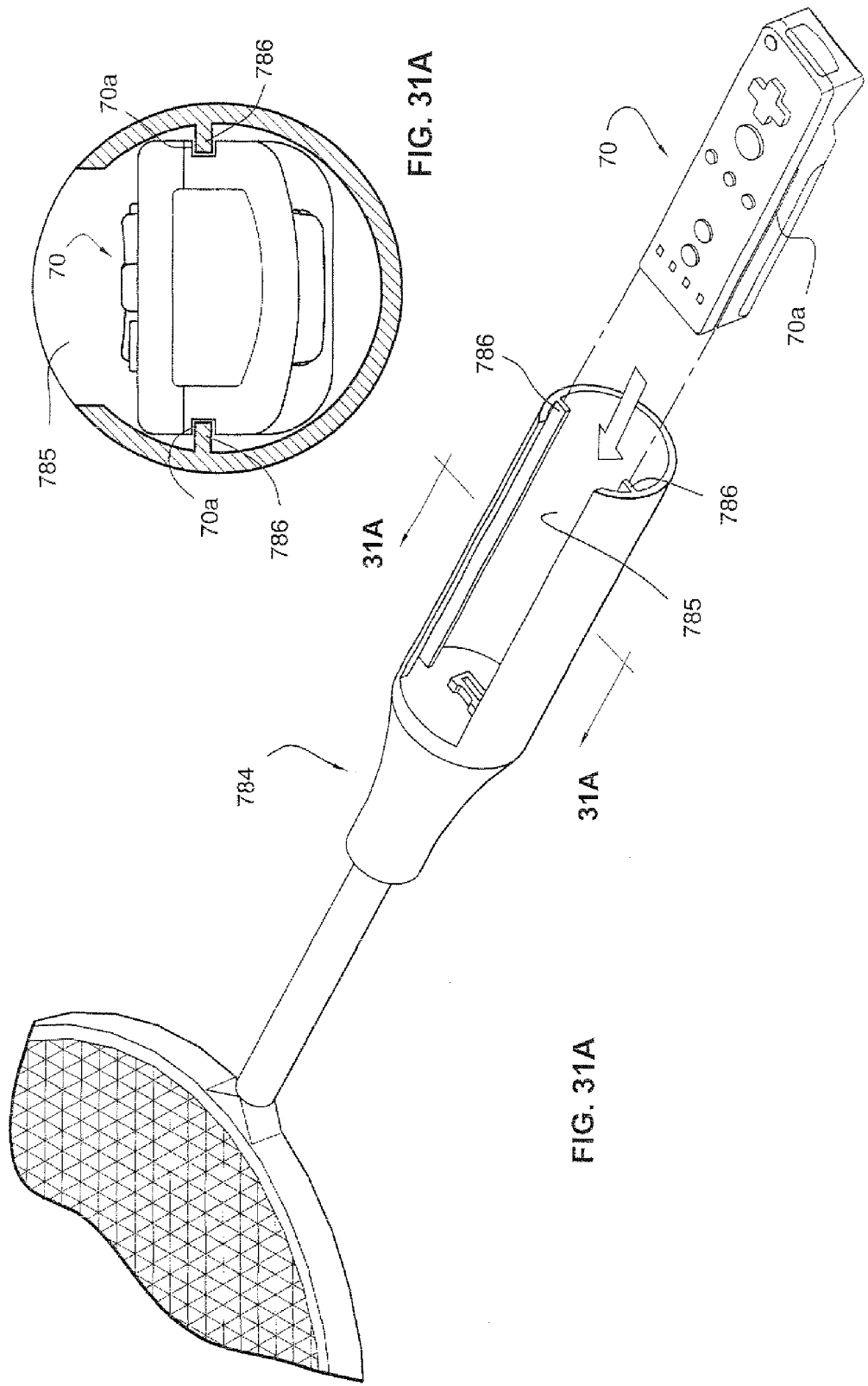
FIGS. 31a and 31b are an example of a core unit detachably secured within the handle portion of a racket type device.

FIG. 30 illustrates a core unit 70 attached to a skateboard 781, and more specifically, within a hollowed center hub portion 782 of a skateboard wheel 783.

FIGS. 31a and 31b illustrate a core unit 70 received within a hollow handle portion of a tennis or badminton racquet 784. More specifically, an open slot 785 is formed in the handle portion of the racket, with opposed flanges 786 adapted to be received within aligned slots 70a formed along opposite sides of the core unit 70.

Figure 32:
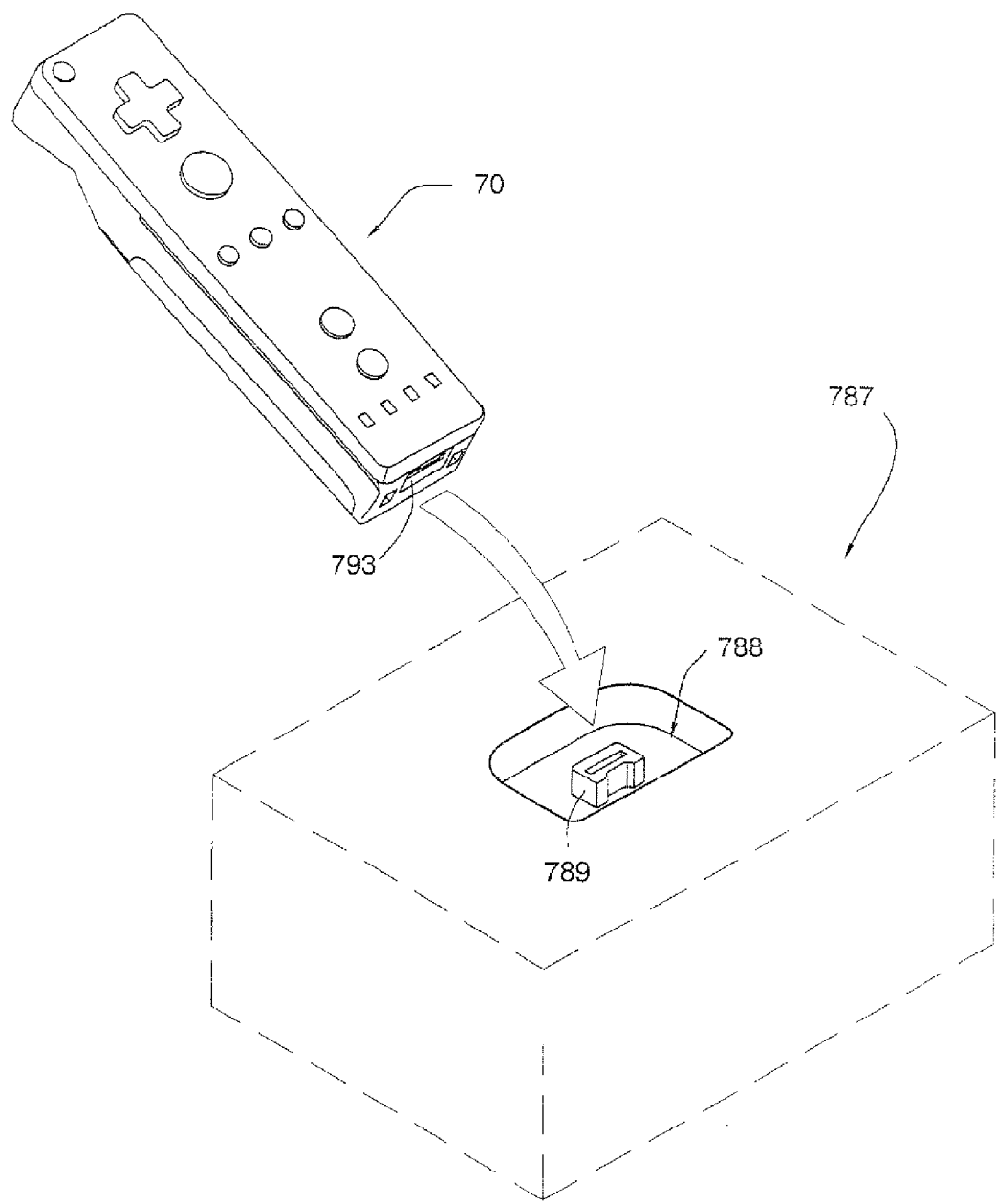
FIG. 32 is a generic example of a core unit secured to a generic docking or receptor device.

FIG. 32 illustrates, in a generic sense, a receiving or docking device (or sub-unit) 787 formed with a recess 788 on its top side in which is seated a male connector 789 adapted to be received in the female connector 73 in the base of the core unit 70.

Figure 33:
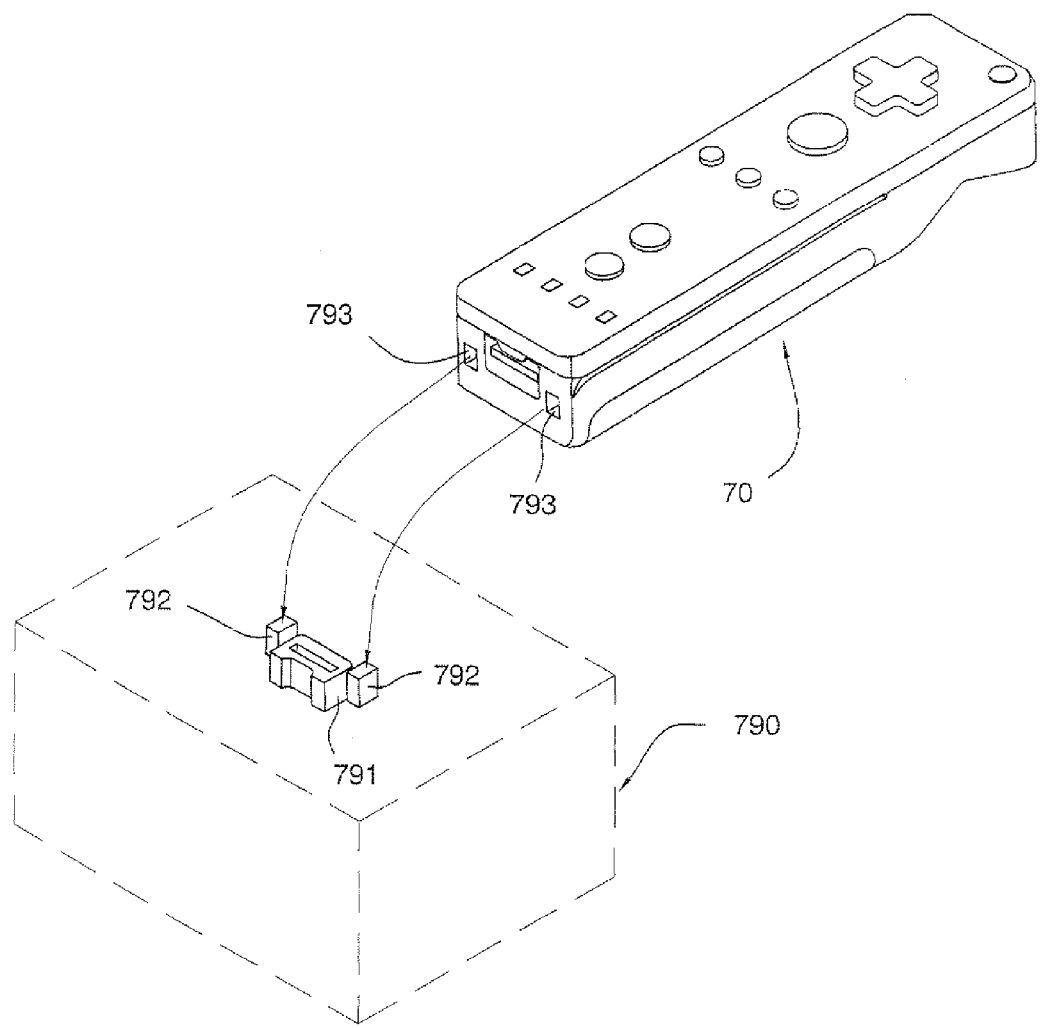
FIG. 33 is another example of a core unit detachably secured to a generic docking or receptor device.

FIG. 33 illustrates a slightly modified arrangement where the core unit 70 is connected to a sub-unit 790 and wherein the male connector 791 projects from the top surface of the device and, in order to stabilize the attachment, projecting tabs 792 on either side of the connector 791 are utilized in conjunction with mating recesses or holes 793 formed in the base of the core unit 70, on either side of the female connector 73.

From the above, it will be appreciated that the core unit 70 may be detachably secured in any number of ways to any number of receptor devices or sub-units that may or may not have additional control units or buttons incorporated therein, and where some or all of the functionality of the core unit 70 are utilized. The above examples of the various receptors are intended to be illustrative only, and the invention is no way limited to any specifically shaped or configured receptor. It will be appreciated that the receptor device may or may not be at least peripherally related to the subject matter of the video game being played.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

What is claimed is:

1. A video game controller and receptor assembly comprising:
　an elongated, substantially rectangular electronic video game controller core unit for operating an electronic game comprising a housing having a top, bottom, opposite sides, a forward end and a rearward end, said top having a plurality of control buttons including a cross-key thereon and said bottom having an inclined face with a trigger switch adjacent said forward end and projecting from said inclined face; and
　a receptor unit shaped to simulate a device held or worn by a character in the electronic game, said receptor formed with a forwardly-facing open-topped recess with sides and a bottom defining a shape substantially similar to at least a portion of the bottom and opposite sides of the video game controller core unit received in said recess, such that said forward end and said trigger switch project forwardly beyond said receptor unit.

2. The video game controller and receptor assembly of claim 1 wherein said rearward end of said video game controller core unit is provided with a first connector and wherein said recess includes a rear wall provided with a second connector coupled to said first connector to thereby establish an electrical connection between the core unit and the receptor unit.

3. The video game controller and receptor assembly of claim 1 wherein said housing is formed with slots on said opposite sides, and wherein said recess is formed with aligned ribs adapted to be received within said slots.

4. The video game controller and receptor assembly of claim 2 wherein said first connector is a male connector and said second connector is a female connector.

5. The video game controller and receptor assembly of claim 2 wherein said receptor unit is provided with at least one switch that performs a function of one of said control buttons or said trigger switch.

6. A video game controller and receptor assembly comprising:
- an elongated, substantially rectangular electronic video game controller core unit for operating an electronic game comprising a housing having a top, bottom, opposite sides, a forward end and a rearward end, said top having a plurality of control buttons including a cross-key thereon and said bottom having an inclined face with a trigger switch adjacent said forward end and projecting from said inclined face;
- a receptor unit shaped to simulate a device held or worn by a character in the electronic game, said receptor formed with a forwardly-facing open-topped recess with sides and a bottom defining a shape substantially similar to at least a portion of the bottom and opposite sides of the video game controller core unit received in said recess; and
- wherein said receptor unit is provided with two switches that perform respective functions of said trigger switch and one of said control buttons.

7. The video game controller and receptor assembly of claim 6 wherein said receptor unit comprises a second controller in the shape of a steering wheel or a joystick.

8. The video game controller and receptor assembly of claim 6 wherein said receptor unit comprises a game racquet.

9. The video game controller and receptor assembly of claim 6 wherein said receptor unit comprises a ball bat.

10. The video game controller and receptor assembly of claim 6 wherein said receptor unit comprises a chair.

11. The video game controller and receptor assembly of claim 6 wherein said receptor unit comprises a fishing rod assembly.

12. The video game controller and receptor assembly of claim 6 wherein said receptor unit comprises a golf club.

13. The video game controller and receptor assembly of claim 6 wherein said receptor unit comprises a toy figure.

14. The video game controller and receptor assembly of claim 6 wherein said receptor unit comprises a wheeled toy.

15. A receptor for an electronic video game controller comprising:
- a receptor housing including side walls extending along an elongated forward portion and a rearward gripper portion; a substantially U-shaped slot formed in said elongated forward portion in part by said side walls, said substantially U-shaped slot open at a forward aiming end of said forward portion of said receptor housing and adapted to receive an electronic video game controller such that, in use, said forward aiming end of said receptor housing and a forward end of the electronic video game controller can be aimed at a target display; said substantially U-shaped slot having a length sufficient to support a portion of the electronic video game controller substantially co-axially with said elongated forward portion of said receptor housing;
- a first connector at a rearward, closed end of said substantially U-shaped slot adapted to align with and engage a mating second connector on a rearward end of the electronic video game controller to thereby enable electrical connection between said receptor housing and the electronic video game controller;
- a trigger switch located within said receptor housing, substantially axially aligned with said substantially U-shaped slot, rearwardly of said first connector, said trigger switch accessible through openings in said sidewalls; and
- a universal stick on said receptor housing at in interface between said elongated portion and said gripper portion.

16. The receptor of claim 15 wherein said gripper portion extends angularly from said elongated portion.

17. The receptor of claim 15 in combination with the electronic video game controller, said electronic video game controller having a controller housing including a top face, a bottom, opposite sides, forward and rearward ends, a trigger button projecting from said bottom and a universal button on said top face; wherein said bottom and said opposite sides of said portion of said controller housing are supported in said U-shaped slot in said receptor housing and have a shape complementary to said U-shaped slot; said forward end of said controller housing, including said trigger button projecting from said forward aiming end of said receptor housing.

18. The receptor of claim 17 wherein, in use, when said receptor and said electronic video game controller are electrically connected, said trigger switch and said universal stick perform functions of said trigger button and said universal button, respectively.

19. A receptor for an electronic video game controller comprising:
- a receptor housing including substantially parallel side walls extending along an elongated forward portion and a rearward gripper portion; a substantially U-shaped slot formed in said elongated forward portion in part by said substantially parallel side walls, said substantially U-shaped slot open at a forward aiming end of said forward portion of said receptor housing remote from said rearward gripper portion and adapted to receive an electronic video game controller such that, in use, said forward aiming end of said receptor housing and a forward end of the electronic video game controller can be aimed at a target display;
- a first connector adapted to align with and engage a mating second connector on the electronic video game controller to thereby establish electrical connection between said receptor housing and the electronic video game controller; and
- a trigger switch located within said elongated forward portion between said substantially parallel side walls and rearwardly of said substantially U-shaped slot, said trigger switch substantially axially aligned with said substantially U-shaped slot and accessible through openings in said substantially parallel sidewalls.

20. The receptor of claim 19 wherein said rearward gripper portion extends angularly downwardly and away from said elongated forward portion.

21. The receptor of claim 19 further comprising a universal stick at in interface between said elongated forward portion and said rearward gripper portion.

22. The receptor of claim 19 wherein said first connector is located at a rearward, closed end of said substantially U-shaped slot.

* * * * *